(12) United States Patent
Discenzo

(10) Patent No.: US 7,535,579 B1
(45) Date of Patent: May 19, 2009

(54) SYSTEM AND METHOD FOR OPTICAL VIBRATION SENSING

(75) Inventor: Frederick M. Discenzo, Brecksville, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 15 days.

(21) Appl. No.: 11/469,546

(22) Filed: Sep. 1, 2006

Related U.S. Application Data

(62) Division of application No. 09/406,368, filed on Sep. 28, 1999, now Pat. No. 7,168,323.

(51) Int. Cl.
*G01B 9/02* (2006.01)
(52) U.S. Cl. ...................................... 356/498
(58) Field of Classification Search .................. 356/498
See application file for complete search history.

(56) References Cited

U.S. PATENT DOCUMENTS

| | | |
|---|---|---|
| 3,709,030 A | 1/1973 | Aselman |
| 4,379,226 A | 4/1983 | Sichling et al. |
| 4,471,659 A | 9/1984 | Udd et al. |
| 4,775,214 A | 10/1988 | Johnson |
| 4,872,348 A | 10/1989 | Curry |
| 5,146,776 A | 9/1992 | Twerdochlib et al. |
| 5,335,548 A | 8/1994 | Kalibjian |
| 5,359,445 A | 10/1994 | Robertson |
| 5,381,492 A | 1/1995 | Dooley et al. |
| 5,495,767 A * | 3/1996 | Wang et al. ................... 73/657 |
| 5,497,233 A | 3/1996 | Meyer |
| 5,513,533 A | 5/1996 | Wheeler et al. |
| 5,805,056 A | 9/1998 | Mueller et al. |
| 5,837,998 A | 11/1998 | Dinev et al. |

* cited by examiner

*Primary Examiner*—Hwa (Andrew) S Lee
(74) *Attorney, Agent, or Firm*—Amin Turocy & Calvin LLP; R. Scott Speroff

(57) ABSTRACT

A system for sensing vibration of a machine is provided. A light source directs a beam of light toward a light receiving system adapted to receive at least a portion of the beam of light. A light modulating system modulates the light beam received by the light receiving system so as to correspond to vibration of the machine. A processing system operatively coupled to the light receiving system processes data received from the light receiving system to facilitate determining vibration of the machine.

7 Claims, 17 Drawing Sheets

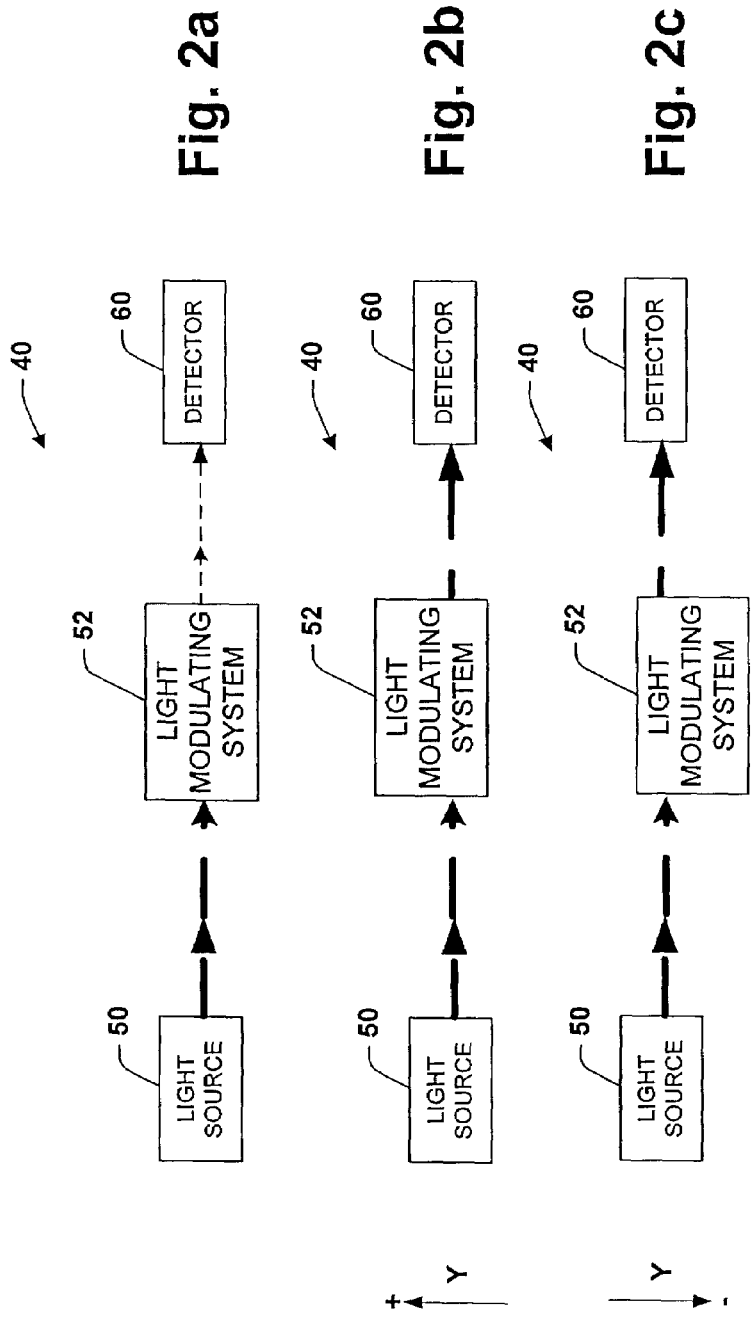

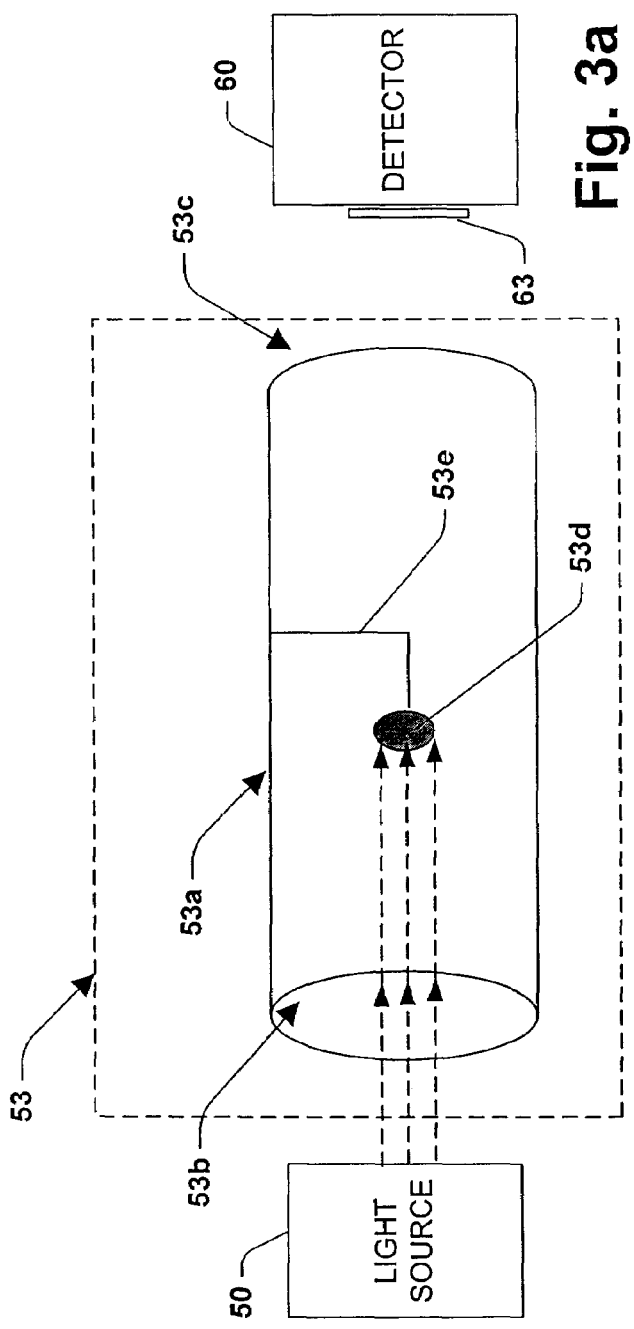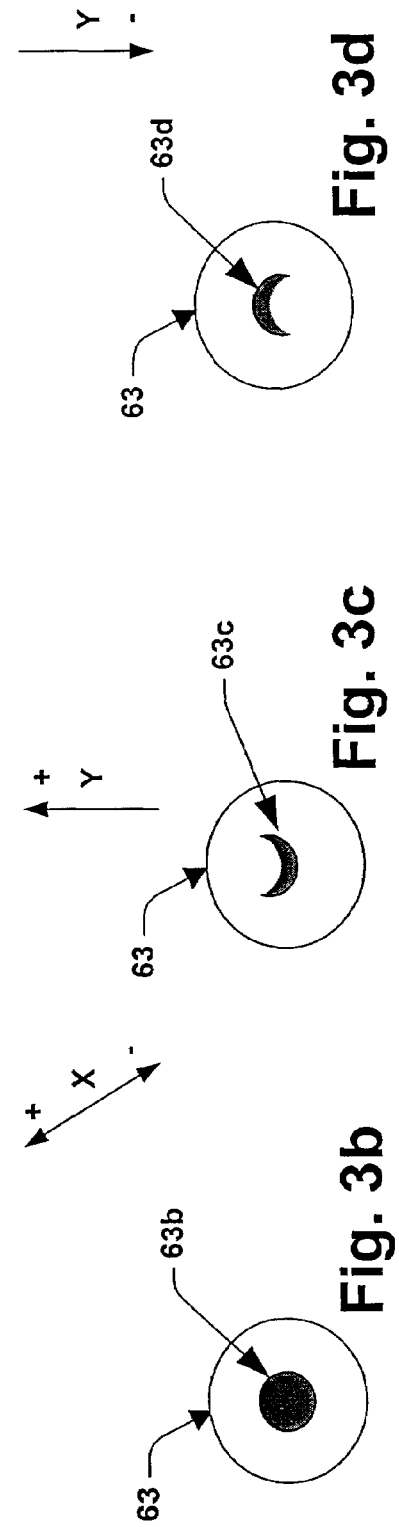

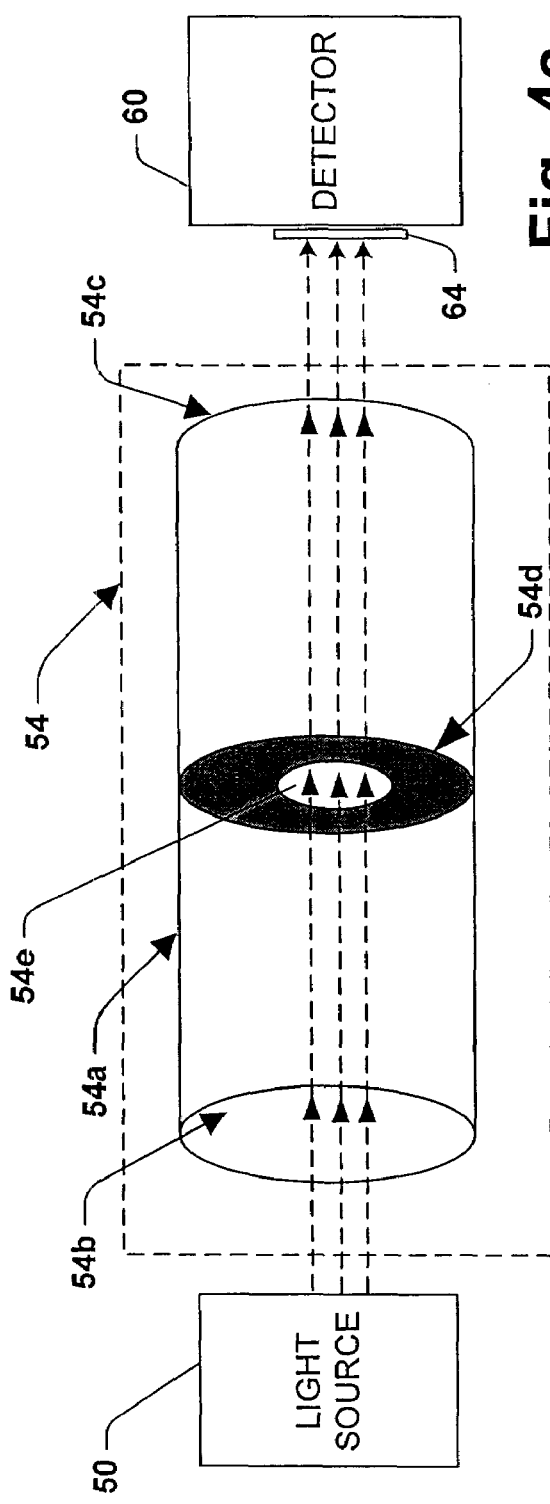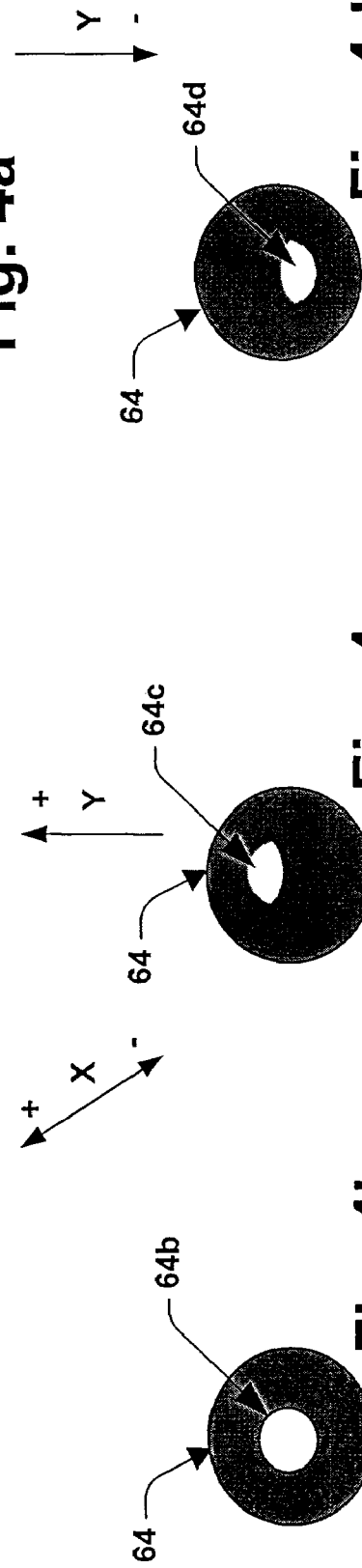
Fig. 4a
Fig. 4b
Fig. 4c
Fig. 4d

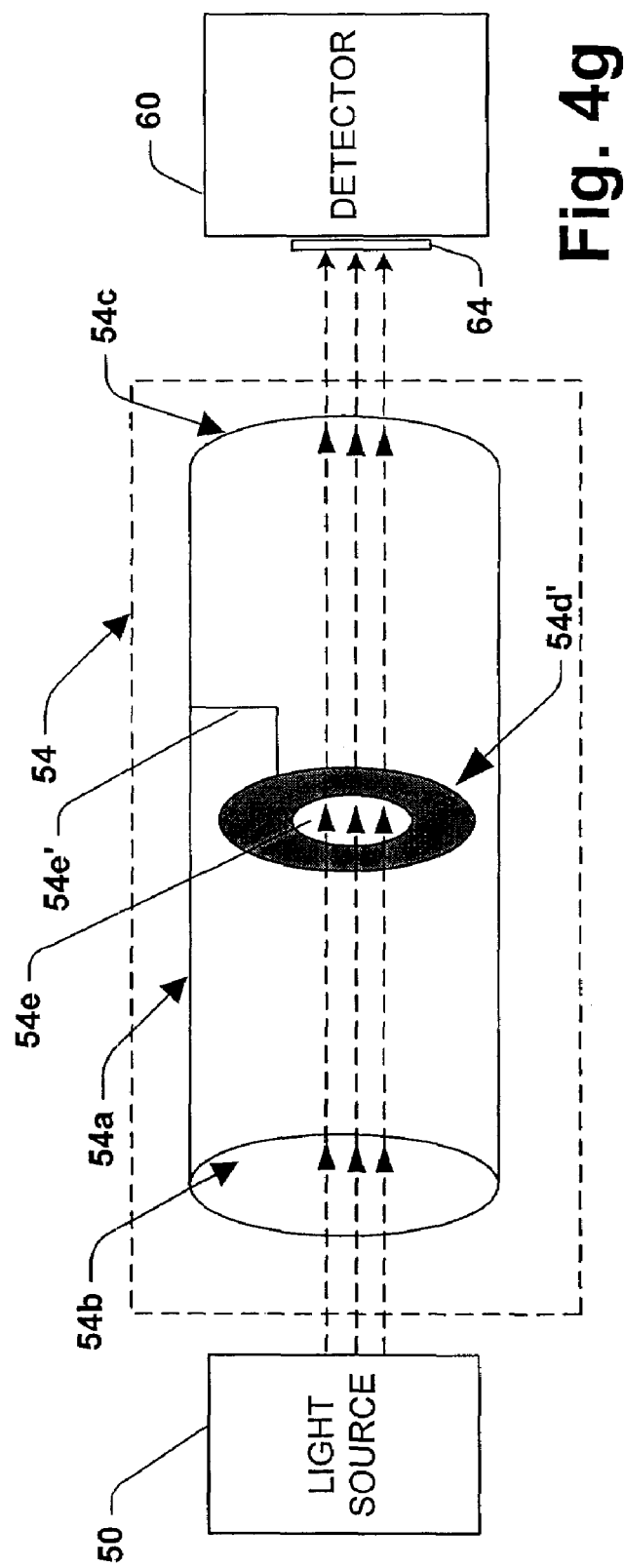

SYSTEM AND METHOD FOR OPTICAL VIBRATION SENSING

CROSS-REFERENCE TO RELATED APPLICATIONS

This is a divisional application of U.S. patent application Ser. No. 09/406,368, filed Sep. 28, 1999, entitled "SYSTEM AND METHOD FOR OPTICAL VIBRATION SENSING", the entirety of which is incorporated by reference herein.

FIELD OF THE INVENTION

The present invention generally relates to a system and method for obtaining vibration data from vibrating structures for diagnosis and failure analysis. In particular, the present invention employs an optical sensing system to acquire vibration data to diagnose the state of a structure subject to vibrational forces.

BACKGROUND OF THE INVENTION

Vibrating structures, including electric machines such as motors and generators, are widely employed in industrial and commercial facilities. These machines are relied upon to operate with minimal attention and provide for long, reliable operation. Many facilities operate several hundreds or even thousands of such machines concurrently, many of which are integrated into a large interdependent process or system. Like most machinery, at least a small percentage of such are prone to failure. The majority of such failures can be attributed to either mechanical failures and/or thermal failures of the machine insulation.

Other than normal aging, failures are typically due to: poor or no maintenance; improper application (e.g., wrong enclosure, excessive loading, etc.); and improper installation (e.g., misalignment, bad power, inverter mismatch, etc.). Even with normal aging failures, it is desirable to provide low cost failure prediction information for such machines.

Depending on the application, the failure of a machine in service can possibly lead to system or process down time, inconvenience, and possibly even a hazardous situation. Thus, it is desirable to diagnose the machinery for possible failure or faults early in order to avoid such problems.

Vibration analysis is an established technique for determining the health of mechanical components in rotating machinery such as motors. To obtain vibration data from machinery and other structures, accelerometers as well as associated sampling and filtering techniques are often employed. Larger machines and/or systems may also employ proximity detectors in addition to or instead of accelerometers to determine vibration.

In structures such as electric machines, multiple axis detection and multiple location sensing typically are necessary to properly diagnose vibration in the machine. Thus, in many cases, multiple sensors and detectors are required to be located on the machine. As more and more sensing elements are added to the machine, cost associated therewith increases. Also, for critical machines, additional failure detection mechanisms may be needed because the sensing elements themselves can fail.

The accelerometers typically employed utilize a moving mass which is coupled with other mechanical and electrical components to generate an electrical signal (e.g., magnetically or capacitively coupled). The resulting electrical signal must then be transmitted via electrical wires where it may be filtered, digitized, analyzed (e.g., FFT analysis) and appropriate control and data recording performed. Due to the low signal levels and the amount of data to be transferred, the length of the signal wires are generally limited and the wire lengths are minimized where possible. In an electrically noisy environment, such as an electric motor, more costly shielded cables are used and there will be further processing performed very near the sensor or integral with the sensor.

Typical accelerometers will therefore employ signal wires which contain a varying voltage or current which indicate the vibration experienced at the sensor. In addition, several more wires must also be routed to the sensor to provide power to the accelerometer. The additional wires must be routed through and attached to the structure and represent a possible location for shorting or sparking or for picking up electrical noise which may influence the sensor readings.

Consequently, there is a strong need in the art for a system and/or method for detecting vibrations in structures that requires minimal components, requires less wiring, provides for high noise immunity, provides for lower maintenance, and provides for lower costs.

SUMMARY OF THE INVENTION

The present invention provides for a system and method for acquiring vibration data using optical sensing. It has been found that vibration data relating to the state of a machine or structure may be acquired by employing light modulating systems to minimize components. Also, it has been found that waveguide technology employing evanescent coupling may be used for optical vibration sensing eliminating additional field excitation components. Additionally, it has been found that precise vibration data can be achieved using optical resonators. Thus, the present invention provides for a system and method to obtain optical vibration data via optics, which typically employs fewer components and sensors than conventional vibration sensing systems.

More particularly, in a preferred embodiment, the present invention includes light modulating systems employing cantilevered obstruction modulators and/or suspended portal modulators requiring minimal components. Thus, light modulating systems mitigate the need to enter a complex machine or structure to replace sensors and mitigates additional wiring in the machine. Additionally, light modulating systems are noise immune in harsh electrically noisy environments, and they are conducive for use in explosive environments where a small spark may have catastrophic consequences. In another embodiment, the present invention includes optical waveguide technology employing a variable separation distance between waveguides to mitigate the need for external vibration sensing elements. In yet another embodiment, the present invention allows for precise sensing of vibration employing an optical lateral resonator that may be readily positioned along a desired axis.

The present invention will be described with respect to an AC motor, however, it is to be appreciated that the present invention has applicability to many types of machines or vibrating structures whereby vibration analysis can be performed to determine the state (e.g., health) of the machines or structures. Other structures include buildings, bridges, automobiles, aircrafts, pumps, internal combustion engines, bearings, etc. Essentially, the aforementioned techniques may be applied to structures subject to vibrational forces—internally or externally generated as well as to lower frequency vibrational forces as may be sensed using any of a variety of seismometers.

By employing light modulating systems in a structure, or by employing separation distances using waveguide technology, or by readily positioning a precision sensor, or by using combinations of these methods, many components and/or sensors used in conventional systems may be eliminated or reduced via employment of the present invention. The present invention provides for a system and method for acquiring vibration data which is a more cost effective and reliable.

One aspect of the present invention relates to a system for sensing vibration of a machine. A light source directs a beam of light toward a light receiving system adapted to receive at least a portion of the beam of light. A light modulating system modulates the light beam received by the light receiving system so as to correspond to vibration of the machine. A processing system operatively coupled to the light receiving system process data received from the light receiving system to facilitate determining vibration of the machine.

Another aspect of the present invention relates to a multiple axis vibration detection system. The system includes a light source for directing a beam of light and a light receiving system for receiving at least a portion of the beam of light. The system further includes a first light modulating system for modulating the light beam received by the light receiving system so as to correspond with vibration of the machine; and a second light modulating system for modulating the light beam received by the light receiving system so as to correspond with vibration of the machine, the second light modulating system being in series to the first light modulating system. A processing system operatively coupled to the light receiving system processes the data received from the light receiving system to facilitate determining vibration of the machine.

Another aspect of the present invention relates to a system for sensing vibration of a machine. The system includes a light source for directing a beam of light; and a light receiving system for receiving at least a portion of the beam of light. The system further includes a first waveguide for transmitting the beam of light, the first waveguide adapted to vibrate in response to vibration of the machine; and a second waveguide having at least a portion thereof located within a predetermined distance to at least a portion of the first waveguide such that evanescent coupling occurs between the waveguides whereby the second waveguide transmits the at least a portion of the beam of light to the receiving system. The intensity of the at least a portion of the beam of light varies as a function of the vibration of the machine.

Still yet another aspect of the present invention relates to a system for sensing vibration of a machine, comprising: first, second and third light sources for directing beams of light of different frequencies, respectively; a light receiving system for receiving at a least portion of the beams of light; a first waveguide for transmitting the first beam of light, the first waveguide adapted to vibrate in response to vibration of the machine; a second waveguide for transmitting the second beam of light, the second waveguide adapted to vibrate in response to vibration of the machine; a third waveguide for transmitting the third beam of light, the third waveguide adapted to vibrate in response to vibration of the machine; and a fourth waveguide having at least a portion thereof located within a predetermined distance to at least portions of the first, second and third waveguides, respectively, such that evanescent coupling occurs between the waveguides whereby the fourth waveguide transmits the at least portion of the beams of light to the receiving system; wherein the intensity of the respective at least portion of the beams of light vary as a function of the vibration of the machine.

Another aspect of the present invention relates to a system for sensing vibration of a machine. The system includes a light source for directing a beam of light; and a beam splitter for splitting the beam of light into at least a first beam and a second beam. The system further includes an optical lateral resonating system for receiving the second beam, the optical lateral resonator reflecting the second beam, the optical lateral resonating system deflecting in response to vibration such that a transmission path of the second beam varies in length as a function of deflection of the optical lateral resonating system; and a receiving system for receiving an interference beam, the interference beam including a combination of the first beam and reflected second beam. The system also includes a processing system which processes and analyzes the interference beam to facilitate determining vibration of the machine.

Still another aspect of the present invention relates to a system for sensing vibration of a machine, including: means for directing a beam of light; means for receiving at least a portion of the beam of light; means for modulating the light beam received by the means for receiving so as to correspond with vibration of the machine; and means for processing the data received from the means for receiving to facilitate determining vibration of the machine.

Yet another aspect of the present invention relates to a system for sensing vibration of a machine, including: means for directing a beam of light; means for receiving at least a portion of the beam of light; a first means for transmitting the beam of light, the first means adapted to vibrate in response to vibration of the machine; and a second means for transmitting light, having at least a portion thereof located within a predetermined distance to at least a portion of the first means such that evanescent coupling occurs between the first and second means whereby the second means transmits the at least a portion of the beam of light to the means for receiving; wherein the intensity of the at least a portion of the beam of light varies as a function of the vibration of the machine.

Another aspect of the present invention relates to a system for sensing vibration of a machine, including: means for directing a beam of light; means for splitting the beam of light into at least a first beam and a second beam; means for receiving the second beam, means for receiving the second beam reflecting the second beam, the means for receiving the second beam deflecting in response to vibration such that a transmission path of the second beam varies in length as a function of deflection of the means for receiving the second beam; means for receiving an interference beam, the interference beam including a combination of the first beam and reflected second beam; and means for processing and analyzing the interference beam to facilitate determining vibration of the machine.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 2a is a schematic block diagram of a light modulating system passing minimal light in accordance with the present invention;

FIGS. 2b and 2c are schematic block diagrams of a light modulating system passing maximum light in accordance with the present invention;

FIG. 2d is a schematic diagram of a detector output voltage at minimal light in accordance with the present invention;

FIG. 2e is a schematic diagram of a detector output voltage at maximum light in accordance with the present invention;

FIG. 2f is a schematic diagram of modulated detector output voltage in accordance with the present invention;

FIG. 3a is a schematic diagram of a cantilevered obstruction modulator in accordance with the present invention;

FIG. 3b is a diagram of a detector front when no movement occurs in a cantilevered obstruction modulator in accordance with the present invention;

FIGS. 3c and 3d are diagrams of a detector front when movement occurs in a cantilevered obstruction modulator in accordance with the present invention;

FIG. 4a is a schematic diagram of a suspended portal modulator in accordance with the present invention;

FIG. 4b is a diagram of a detector front when no movement occurs in a suspended portal modulator in accordance with the present invention;

FIGS. 4c and 4d are diagrams of a detector front when movement occurs in a suspended portal modulator in accordance with the present invention;

FIG. 4g is a schematic diagram of a suspended portal modulator cantilevered to a housing in accordance with the present invention;

DETAILED DESCRIPTION OF THE INVENTION

Figure 1:
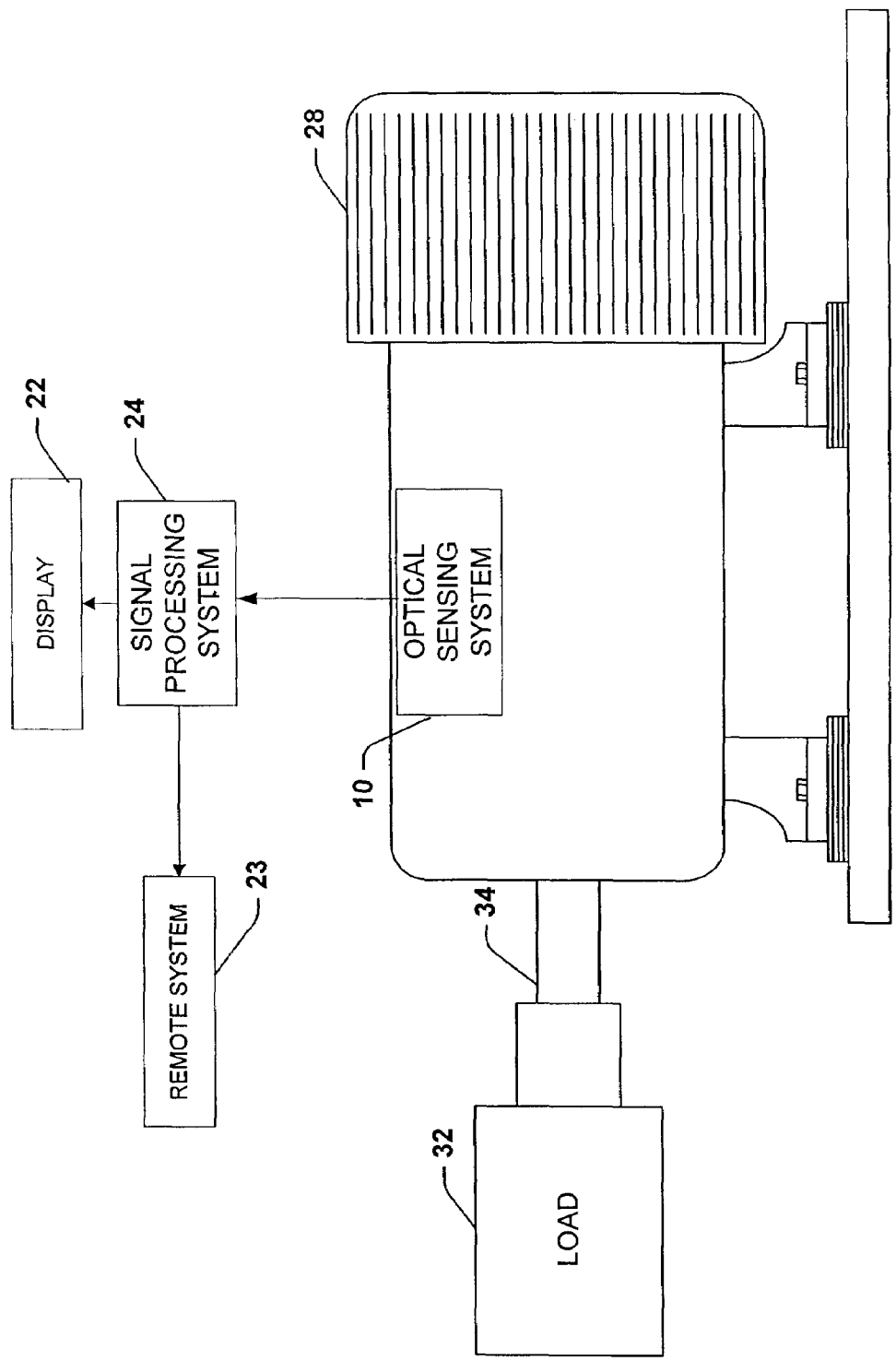
FIG. 1 is a schematic illustration of an integrated AC motor and optical sensing system in accordance with one particular aspect of the present invention.

The present invention will now be described with reference to the drawings, wherein like reference numerals are used to refer to like elements throughout.

Referring initially to FIG. 1, one specific environment in which the present invention may be employed is shown. Specifically, an optical sensing system 10 is shown which is coupled to a motor 28. The motor 28 is depicted driving a load 32 through a shaft coupling 34. The motor 28 is but one example of a vibrating structure whereby the optical sensing systems 10 of the present invention may be employed to gather vibration data. It is to be appreciated that the load 32 may be sensed for vibration although not shown in FIG. 1.

The optical sensing system 10 produces a signal which represents a modulated light signal. The light signal is modulated from vibrational movements of the motor 28. The light signal may be modulated without placing light sources or optical detectors within the motor 28. Thus, wiring expenses and maintenance costs may be minimized. Alternatively, the optical sensing system may be located internal to the motor 28 such as inside the motor end bracket adjacent to the motor bearing (often a source of critical motor vibration). Consequently, only a fiber optic cable is installed and no signal degradation will occur regardless of the degree of electrical noise inside the motor. Although a single optical sensing system 10 is shown, preferably multiple optical sensing systems 10 are employed to detect multiple axes of vibration The optical sensing system 10 may be placed in a plurality of directions necessary for proper diagnosis of the motor 28. It is to be appreciated that a plurality of the optical sensing systems 10 may be employed depending on the need for more or less vibration data. It is further to be appreciated that the optical sensing system 10 could be located internally or externally on the motor 28. In the preferred embodiment shown in FIG. 1, the optical sensing system 10 is located internal to the motor 28. Finally, multiple optical sensing systems may be employed in a front end and rear end bracket (not shown) adjacent to the outer race (not shown) of the motor 28 bearings.

For example, a comprehensive vibration analysis of a motor may require five or more axis/locations for acceleration data. The axis/locations may include X and Y (orthogonal) radial directions at one end of the motor, X and Y (orthogonal) radical directions at the other end of the motor, an axial (parallel to the shaft) direction, and possible angular direction parallel to the mounting plane among others.

Operatively coupled to the optical sensing system 10 is a signal processing system 24 for receiving a vibration signal. The signal processing system 24 may compute, display, analyze, store, trend, and transmit vibration data to an operator or other intelligent system for analysis. In the preferred embodiment, the signal processing system 24 is local to the motor 28. However, the signal processing system 24 may be located remote to the motor 28. When the signal processing system 24 is located remote from the motor 28, it is beneficial to route the optical fibers that transmit optical signals in existing power trays adjacent to high power/high frequency cables. Unlike conventional electrical systems, there is no danger in corrupting the optical signals. In a remote system, the detector 60 may be located remote and integral to the signal processing system 24. Preferably, the signal processing system 24 is coupled to a display 22 for viewing vibration data to diagnose and analyze the motor 28. The signal processing system 24 may also be coupled to a remote system 23. The remote system 23 may be used for gathering and processing vibration data from a plurality of signal processing systems and optical sensing systems associated with a plurality of vibrating machines, respectively. The remote system 23 may analyze the vibration to determine faults or impending faults of the motor 28 (bearings, loose mounting, out-of-balance, out-of-alignment) or the motor's operation. Note the remote system 23 and/or display 22 may be integral to the signal processing system 24. Similarly, the signal processing system with or without the remote system or display may be integral with the optical sensing system 10 and located internal to the motor 28.

Referring to FIG. 2a, an optical sensing system 40 is shown with a light source 50 projecting to a light modulating system 52. The output of the light modulating system 52 is received by a detector 60. The light source 50 which includes a power source (not shown), may be any suitable light source (e.g., lasers, LED's, bulbs, laser diodes, etc.) to produce light for carrying out the present invention. The detector 60 includes optically sensitive material which produces an electrical signal proportional to the amplitude and frequency of light received and may be a single detector, a linear detector, or an array. For example, if the detector 60 receives a large amount of light, the detector 60 will produce an electrical signal which is large in magnitude. Conversely, the detector 60 will produce an electrical signal with small magnitude when less light is received. Thus, the detector 60 produces an amplitude modulated electrical signal based on a variable amplitude optical signal.

FIG. 2a, depicts a light modulating system (LMS) 52 without vibration. Since no vibration is occurring, the detector 60 receives a minimum light signal. Minimum light is graphically depicted as a dashed line from the LMS 52 to the detector 60. As the LMS 52 moves because of vibration, shown as Y+ in FIG. 2b, and Y− in FIG. 2c, a greater amount of light reaches the detector 60 and an electrical signal proportional to the movement (e.g., larger magnitude signal) is produced by the detector 60. A maximum light signal is depicted as a bold line from the LMS 52 to the detector 60 in FIGS. 2b and 2c. As the frequency of movement of the LMS 52 increases, the frequency of the electrical signal produced at the detector 60 will increase. Therefore, the LMS 52 will cause a signal to be produced at the detector 60 proportional to the magnitude and frequency of vibration.

Referring to FIGS. 2d through 2f, the voltage output from detector 60 may be observed with respect to time. FIG. 2d illustrates a minimum voltage signal 60d produced when no movement of the LMS 52 occurs as in FIG. 2a. FIG. 2e illustrates a maximum voltage signal 60e produced when movement of the LMS 52 occurs as in FIGS. 2b and 2c. It is noted that voltage 60e contains the fundamental frequency component of light source 50. FIG. 2f depicts the detector 60 voltage output 60f when the LMS 52 is subject to vibrational movement. As shown by voltage 60f, the fundamental frequency of light source 50 is modulated by movement of the LMS 52.

Figures 2G, 2H, 2I, 2J, 2K, 2L:
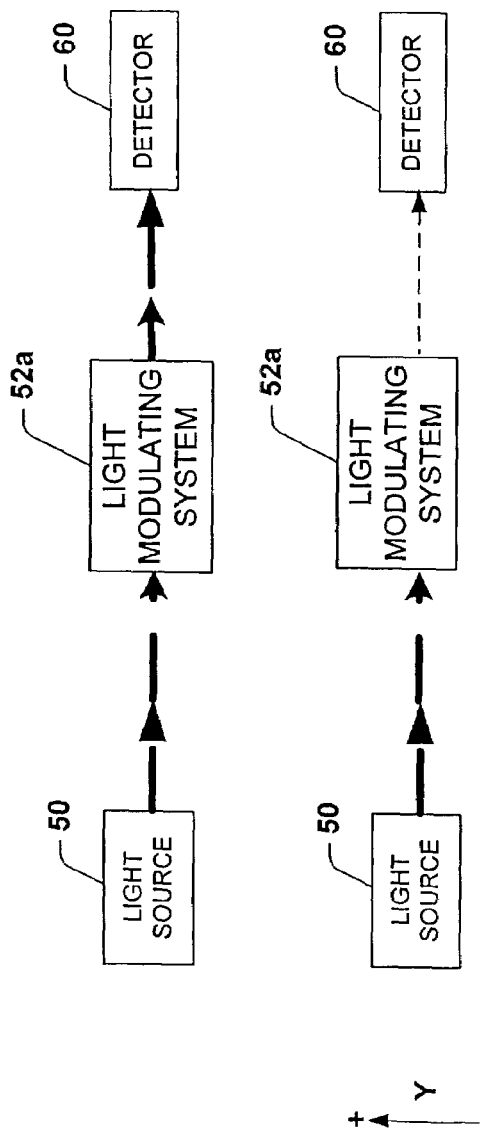
FIG. 2g is a schematic block diagram of a light modulating system passing maximum light in accordance with the present invention.
FIGS. 2h and 2i are schematic block diagrams of a light modulating system passing minimum light in accordance with the present invention.
FIG. 2j is a schematic diagram of a detector output voltage at maximum light in accordance with the present invention.
FIG. 2k is a schematic diagram of a detector output voltage at minimum light in accordance with the present invention.
FIG. 2l is a schematic diagram of modulated detector output voltage in accordance with the present invention.

Referring now to FIG. 2g, another embodiment of a light modulating system 52a is shown which produces maximum light when no movement of the (LMS) 52a occurs. Conversely, FIGS. 2h and 2i depict minimum light detected when movement of the LMS 52a occurs in the Y+ or Y− direction.

Referring to FIGS. 2j through 2l, the voltage output from the detector 60 may be observed with respect to time. FIG. 2j illustrates a maximum voltage signal 60j that is produced when no movement of the LMS 52a occurs as in FIG. 2g. FIG. 2k illustrates a minimum voltage signal 60k that is produced when movement of the LMS 52a occurs as in FIGS. 2h and 2i. It is noted that voltage 60j contains the fundamental frequency component of light source 50. FIG. 2l depicts the detector 60 voltage output 60l when the LMS 52a is subject to vibrational movement. As shown by voltage 60l, the fundamental frequency of light source 50 is modulated by movement of the LMS 52a.

Referring now to FIG. 3a, a preferred embodiment of a light modulating system (LMS) 52 is shown. LMS 53 has a housing 53a with a front opening 53b for receiving light from a light source 50 and an opposite opening 53c for passing light to a detector 60. The light entering opening 53b is obstructed by an obstruction modulator 53d which is coupled to housing 53a by a cantilevered support arm 53e. When no movement of LMS 53 occurs, the obstruction modulator 53d substantially prevents light from reaching a detector face 63. The obstruction modulator 53d may be constructed of a plurality of light obstructing materials such as metal, wood, or plastic. It is to be appreciated that any material capable of preventing a substantial portion of light from reaching detector 60 when no movement of LMS 53 occurs, may be used as the obstruction modulator 53d. It is also to be appreciated that obstruction modulator 53d may be a plurality of shapes such as circular, triangular, rectangular, ovular, etc. The preferred embodiment employs a circular shape.

It should also be appreciated that the cantilever support arm could be extended to the other (illuminated side) of the obstruction disk 53d. Similarly other designs such as employing multiple support arms located circumferentially around the housing 53a may be employed.

By observing FIGS. 3b through 3d, the functions of LMS 53 may be illustrated. FIG. 3b depicts detector face 63 when no movement of LMS 53 occurs. As depicted by a shaded region 63b, light is obstructed by the obstruction modulator 53d. The voltage output from detector 60 correlating to FIG. 3b is shown in FIG. 2d. As movement occurs in the Y+ or Y− direction illustrated in FIGS. 3c and 3d, more light reaches detector front 63 correlating to the voltage shown in FIG. 2e. When vibrational movement of LMS 53 begins at a given frequency, a modulated voltage output from the detector 60 is shown in FIG. 2f. As will be described in more detail below, the voltage in FIG. 2f is filtered to remove the light frequency component thereby leaving the vibration frequency component. It is to be appreciated that a plurality of directions may be detected, for example, movement in the X+ or X− direction. It is noted that axis vibration directions may be limited to a particular direction. For example, the cantilevered support arm 53e may be stiffened horizontally or vertically to prevent vibration in the X or Y axis.

LMS 53 illustrates how costs may be reduced in an optical system. Light source 50 and detector 60 may be located externally to a structure thereby eliminating internal wiring and maintenance expenses. More importantly, the obstruction modulator 53d and housing 53a may be naturally occurring obstructions and openings in a machine or structure thereby eliminating additional sensing elements.

Turning to FIG. 4a, another embodiment of a low cost light modulating system (LMS) 54 is illustrated. LMS 54 has a housing 54a with a front opening 54b for receiving light from a light source 50 and an opposite opening 54c for passing light to a detector 60. The light entering opening 54b is passed through a suspended portal modulator 54d having an opening 54e and secured to housing 54a. When no movement of LMS 54 occurs, the suspended portal modulator 54d substantially allows light to reach a detector face 64. The suspended portal modulator 54d may be constructed of a plurality of light obstructing material such as metal, wood, or plastic. It is to be appreciated that any material capable of preventing a substantial portion of light from reaching detector 60 when movement of LMS 54 occurs, may be used as the suspended portal modulator 54d. It is also to be appreciated that opening 54e in the suspended portal modulator 54d may be a plurality of shapes such as circular, triangular, rectangular, ovular, etc. The preferred embodiment employs a circular shape. It is to be appreciated that a lens (not shown) may be inserted in the center of the portal modular 54d.

By observing FIGS. 4b through 4d, the functions of LMS 54 may be illustrated. FIG. 4b depicts the detector face 64 when no movement of LMS 54 occurs. As illustrated by non-shaded region 64b, light is passed by the suspended portal modulator 54d. The voltage output from detector 60 correlating to FIG. 4b is shown in FIG. 2j. As movement occurs in the Y+ or Y– direction illustrated in FIGS. 4c and 4d, less light reaches detector face 64 correlating to the voltage shown in FIG. 2k. When vibrational movement of LMS 54 begins at a given frequency, a modulated voltage output from detector 60 is shown in FIG. 2l. As will be described in more detail below, the voltage in FIG. 2l is filtered to remove the light frequency component thereby leaving the vibration frequency component. It is to be appreciated that a plurality of directions may be detected, for example, movement in the X+ or X– direction.

LMS 54, like LMS 53, illustrates how costs may be reduced in an optical system. Light source 50 and detector 60 may be located externally to a structure thereby eliminating internal wiring and maintenance expenses. More importantly, the suspended portal modulator 54d and housing 54a may be naturally occurring obstructions and openings in a machine or structure thereby eliminating additional sensing elements.

Figure 4E:
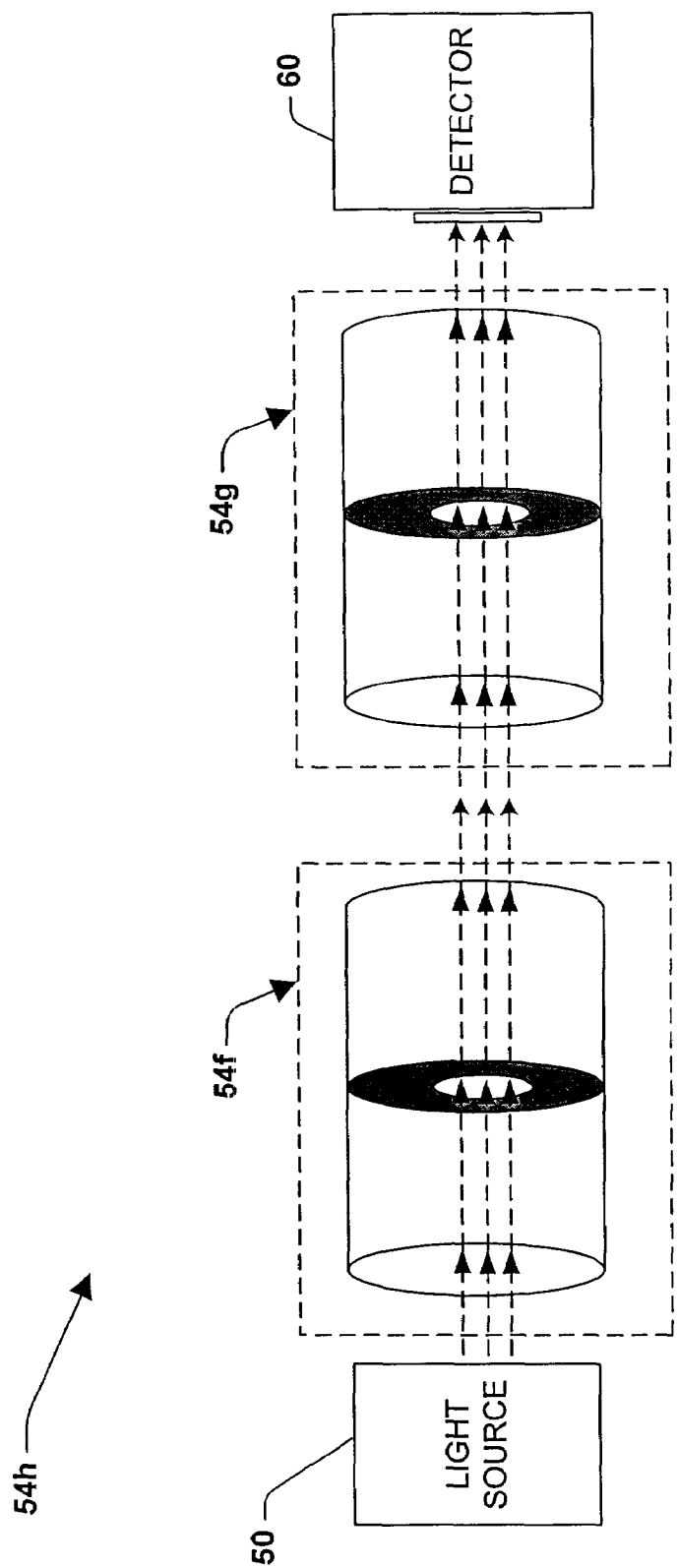
FIG. 4e is a schematic diagram of a suspended portal modulator in a series configured system in accordance with the present invention.

Referring now to FIG. 4e, a low cost multiple axis and/or multi-location vibration detection system 54h is illustrated employing a single light source 50 and a detector 60. In system 54h, an LMS 54f and 54g are shown in a series configuration between the light source 50 and detector 60. It is to be appreciated that a plurality of light modulating systems may be employed in a series configuration. If vibration were detected in either the LMS 54f or 54g, a modulated light signal would be detected by the detector 60. It is noted that LMS 54f and 54g may be along different lines of vibration and direction. For example, a single optical fiber may couple light from the light source 50 to a plurality of light modulating systems in different locations and directions. Several applications may benefit from low cost, series configured light modulating systems. The applications include smart material applications and motor applications whereby a plurality of light modulating systems are embedded in stator windings.

The system 54h, described above, indicates vibration somewhere in the series configured system, however, location and direction information from a particular LMS 54f or 54g is lost because of the series configuration. Referring briefly to FIG. 4a, the suspended portals 54d of each light modulating system employed in series may be constructed such that each suspended portal 54d has a different mass. As a result, each LMS 54f or 54g in FIG. 4e, would have a different mechanical resonant frequency. Consequently, a composite frequency would be received by the detector 60. As will be described in more detail below referring to multiple axis waveguide systems, filtering systems may be employed to extract a particular light modulating system frequency from the mechanical resonant frequency.

Figure 4F:
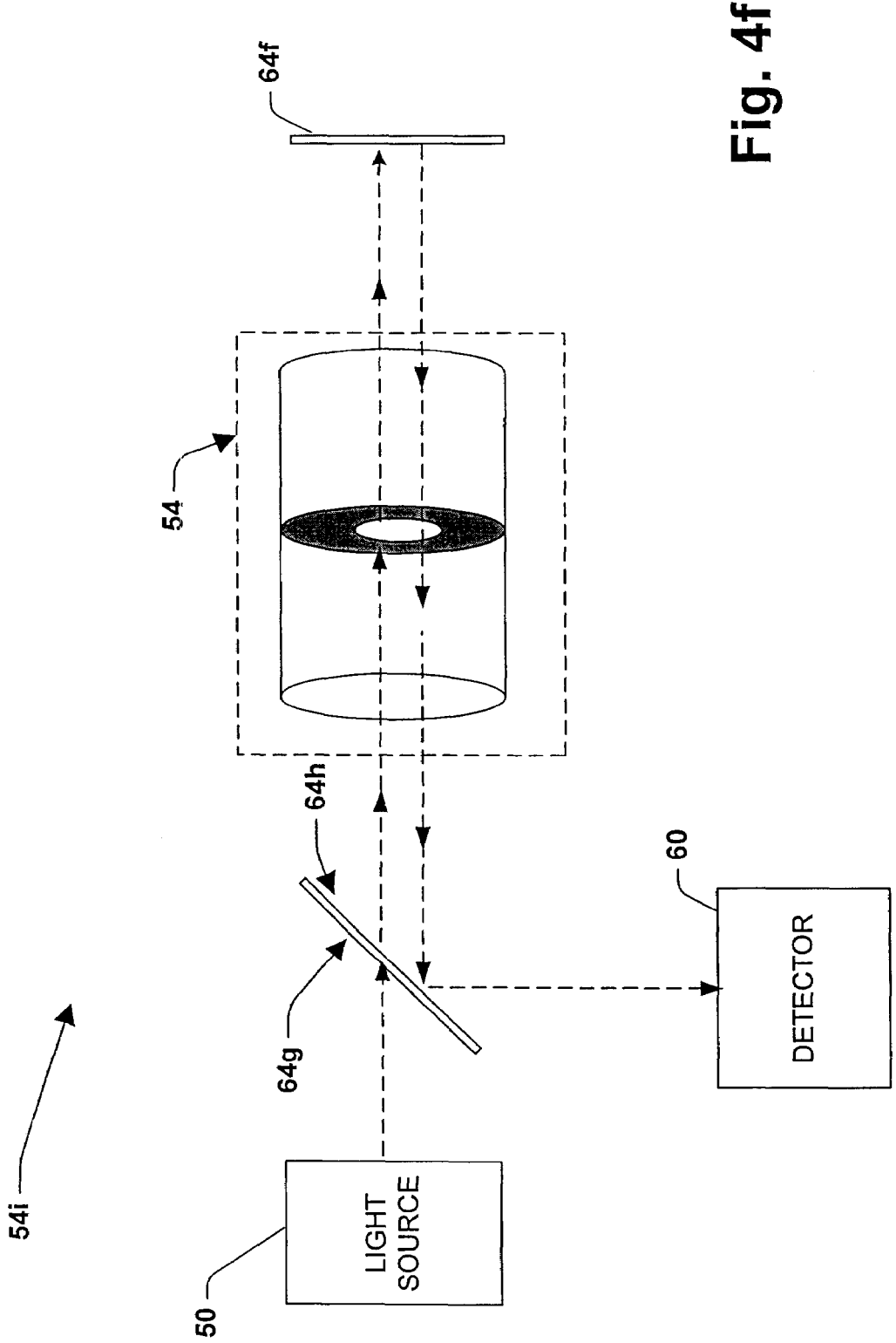
FIG. 4f is a schematic diagram of a suspended portal modulator in a system with a a light directing member in accordance with the present invention.

Referring to FIG. 4f, a system 54i is illustrated whereby the light source 50 and the detector 60 may be located in a similar proximity and position relative to the position of the LMS 54. A light directing member 64g, having an anti-reflective surface 64h and a reflective surface 64i, passes light to the LMS 54. As the light passes through and is modulated by the LMS 54, a reflector 64f reflects the light back to the reflective surface 64i of the light directing member 64g. The reflective surface 64i directs the light to the detector 60 whereby the modulated light is received. The light directing member 64g may be of suitable material to allow light to pass when received in one direction and the light to reflect when received in the opposite direction as is commercially available. It is to be appreciated that the LMS 53 shown in FIG. 3 may be employed for the LMS 54 in FIG. 4f.

Referring to briefly to FIG. 4g, another embodiment of a light modulating system 54 is shown. A suspended portal modulator 54d' is coupled to a housing 54a via a cantilevered support arm 54e'. The suspended portal modulator 54d' functions as in the system shown in FIG. 4a and may be applied to the systems shown in FIGS. 4a through 4f. The cantilevered support arm 54e' provides an alternative coupling to attach the suspended portal modulator 54d' to the housing 54a.

Figure 5:
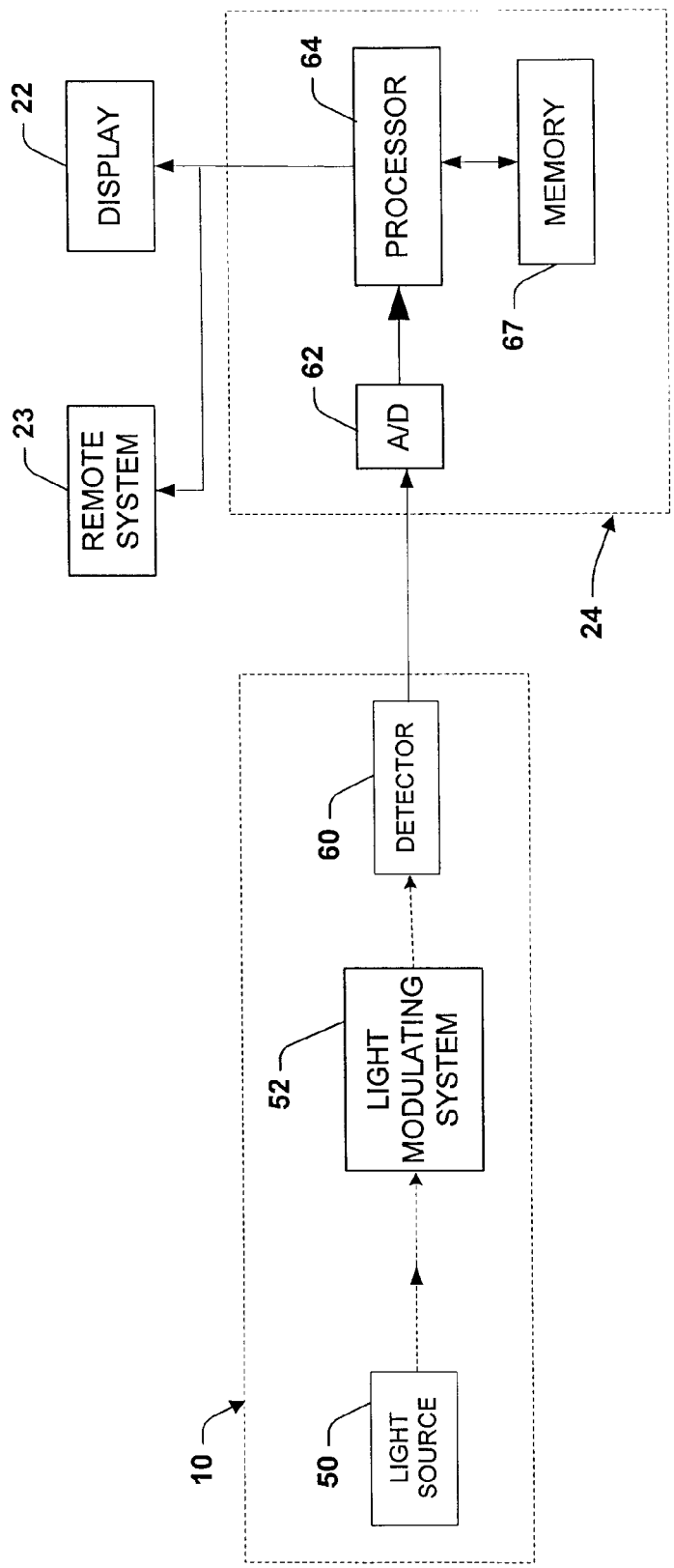
FIG. 5 is a schematic block diagram of a signal processing system in accordance with the present invention.

Referring now to FIG. 5, an optical sensing system 10 is shown operatively coupled to a signal processing system 24. A processor 64 which controls the general operation of the signal processing system 24, may be coupled to a display 22 and/or a remote system 23. The display 22 is employed to provide vibration diagnostic and status information. The remote system 23 may be employed to capture vibration information from a plurality of signal processing systems 24.

The processor 64 is tied to an analog to digital (A/D) converter 62, which converts the analog signals provided by optical sensing system 10 to digital form. The processor 64 is programmed to control and operate various components within the signal processing system 24 in order to carry out the various functions described herein. The processor or CPU 64 can be any of a plurality of processors, such as the p24T, Pentium 50/75, Pentium 60/90, and Pentium 66/100, Pentium PRO and Pentium 2, and other similar and compatible processors. The manner in which the processor 64 can be programmed to carry out functions relating to the present invention will be readily apparent to those having ordinary skill in the art based on the description provided herein.

A memory 67 tied to the processor 64 is also included in the signal processing system 24 and serves to store program code executed by the processor 64 for carrying out operating functions of the signal processing system 24 as described herein. The memory 67 also serves as a storage medium for temporarily storing information such as historical vibration analysis data and the like. The memory 67 is adapted to store a complete set of information to be presented to the display 22 or transmitted to the remote system 23. According to a preferred embodiment, the memory 67 has sufficient capacity to store multiple sets of information, and the processor 64 could include a program for alternating or cycling between various sets of display information. This feature enables the display 22 to show a variety of effects conducive for quickly conveying vibration and other diagnostic information to a user. The signal processing system 24 may also output a digital output of raw data and/or of vibration values. Additionally, the signal processing system 24 may output alarm notifications. Also, the signal processing system 24 and processor 64 may process sampled data from multiple sensing systems 10 employing standard techniques such as multi-channel input or multiplexing techniques.

The memory 67 includes read only memory (ROM) and random access memory (RAM). The ROM contains among other code the Basic Input-Output System (BIOS) which controls basic hardware operations of the signal processing system 24. The RAM is the main memory into which the operating system and application programs are loaded.

Referring briefly to FIGS. 2f and 2l, modulated light frequency is depicted. The modulation frequency is the frequency of vibration. To retrieve the vibration frequency, a low pass filter (not shown in FIG. 5) is employed to remove the light frequency. The preferred embodiment employs digital signal processing techniques that are well known in the art. In FIG. 5, the signal processing system employs a low pass filtering technique to retrieve the vibration frequency. The filtering techniques may include Z-transform or discrete transform digital filtering. Alternatively, the detector 60, may incorporate a suitable low pass filter inherent in its operation.

Figure 6A:
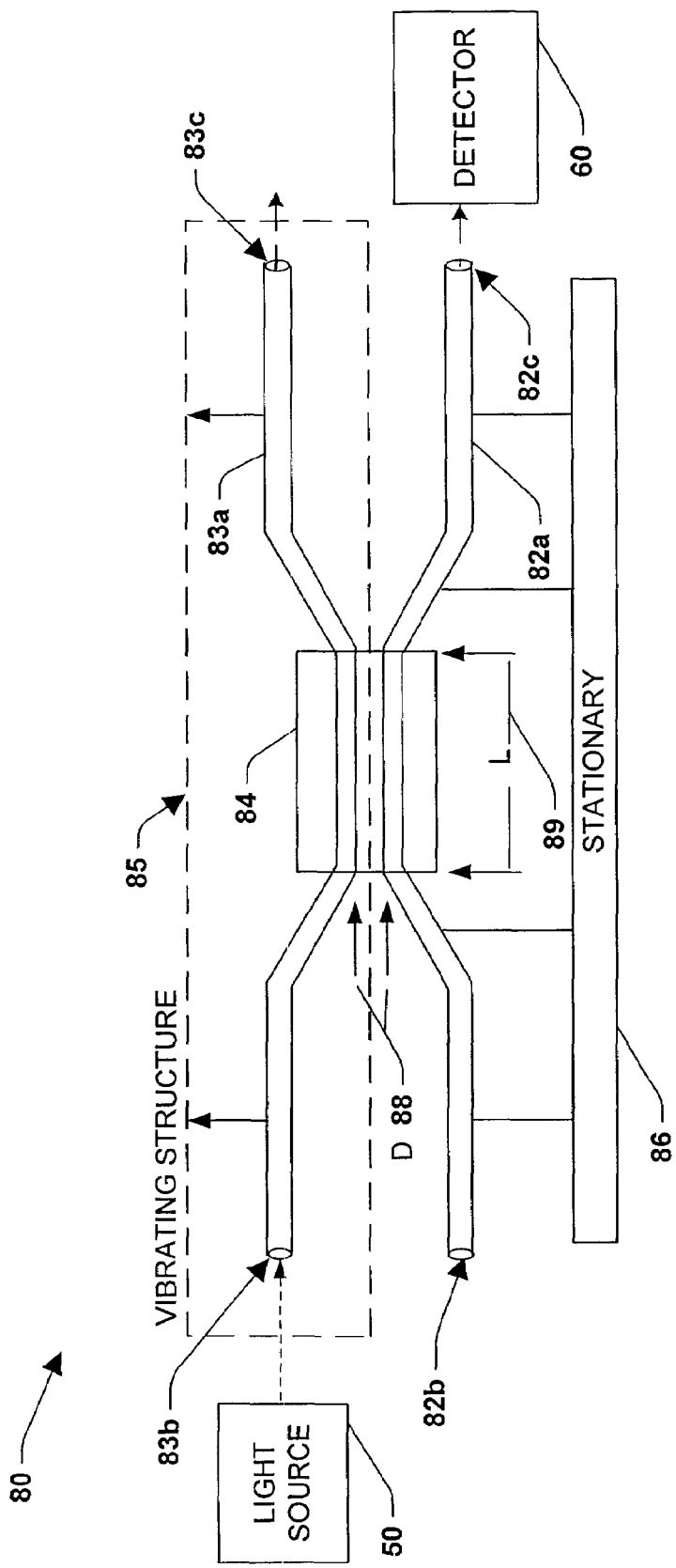
FIG. 6a is a schematic block diagram of a waveguide system illustrating evanescent coupling in accordance with the present invention.

Now referring to another embodiment depicted in FIG. 6a, a system 80 for obtaining optical vibration data is illustrated. In the preferred embodiment shown in FIG. 6a, a waveguide 82a and a waveguide 83a are employed to sense optical vibration data. As explained in more detail below, waveguides 82a and 83a couple vibration data over a separation distance (D) 88 and coupling length (L) 89, in an evanescent coupling region 84. The waveguide separation distance 88, coupling length 89 of close waveguide proximity, and wavelength, $\lambda$ are critical parameters affecting the coupling efficiency. Coupling efficiency determines the quantity of light transferred. As coupling efficiency increases, the quantity of light transferred increases. The system 80 does not require an external vibration sensor to modulate light in waveguide 82a. More particularly, system 80 obtains optical vibration data directly from waveguide 82a by employing a variable separation distance 88 between the waveguides 82a and 83a thereby eliminating an external vibration sensor.

Optical vibration data is coupled to a stationary waveguide 82a as light propagates the waveguide 83a which is subject to vibration. When the waveguide 82a is positioned suitably and substantially close to the waveguide 83a, light from the waveguide 83a will evanescently couple or transfer to the waveguide 82a along the coupling length 89. As distances between the waveguides 82a and 83a increase or decrease, evanescent coupling energy increases or decreases because coupling efficiency is critically dependent on the separation distance 88. With greater coupling efficiency, more light will transfer from the waveguide 83a to the waveguide 82a. In particular, system 80 functions as a directional coupler whereby the coupling efficiency is modulated by the lateral movement of the vibrating structure 85. It is to be appreciated however, that evanescent coupling efficiency may decrease if the distance between the waveguides 82a and 83a continue to decrease. Conversely, as distances between the waveguides 82a and 83a increase, evanescent coupling decreases causing less light to transfer. When vibration causes the waveguide 83a to move smaller and larger distances relative to the stationary waveguide 82a, more or less light will evanescently couple because distances between the waveguides 82a and 83a will vary at the amplitude and frequency of vibration. Thus, light intensity is modulated in the stationary waveguide 82a as vibration causes the distance to vary with respect to waveguide 83a. It is to be appreciated that if the waveguides 82a and 83a were to vibrate with respect to the coupling length 89, light intensity may also be modulated.

In the preferred embodiment, the waveguides 82a and 83a are positioned one half the distance between maximum coupling and minimum coupling determined at the detector 60. For example, the waveguide 82a is positioned to a smaller distance toward the waveguide 83a until a maximum signal is detected at the detector 60. Subsequently, moving in the opposite direction from maximum coupling, the waveguide 82a is positioned to a larger distance from the waveguide 83a until a minimum signal is detected at the detector 60. Before vibration sensing begins, the waveguide 82a is positioned one half the distance between maximum and minimum coupling allowing full peak to peak detection of the vibration signal.

As illustrated in FIG. 6a, waveguide 82a is stationarily positioned relative to waveguide 83a which is secured to a vibrating structure 85. Waveguide 83a is shown affixed to a stationary object 86, however, it is noted that a plurality of suitable techniques may be employed to position waveguide 82a relative to waveguide 83a. By positioning waveguides 82a and 83a in substantially close proximity, shown as D 88, evanescent coupling occurs in region 84 which enables light from waveguide 83a to transfer to waveguide 82a. As shown, a light source 50, preferably a laser, projects light into a first end 83b of waveguide 83a which exits a second end 83c. When waveguide 82a is positioned substantially close enough to waveguide 83a, evanescent coupling occurs in region 84 whereby light will travel to the end 82c of waveguide 82a. A detector 60 coupled to a second end 82c of waveguide 82a receives light evanescently coupled from region 84. The detector 60 output voltage is illustrated in FIG. 2j when maximum evanescent coupling occurs. Note that size and mass of the vibrating structure 85 may be substantially reduced as needed to provide higher frequency vibration sensing capability.

Figure 6B:
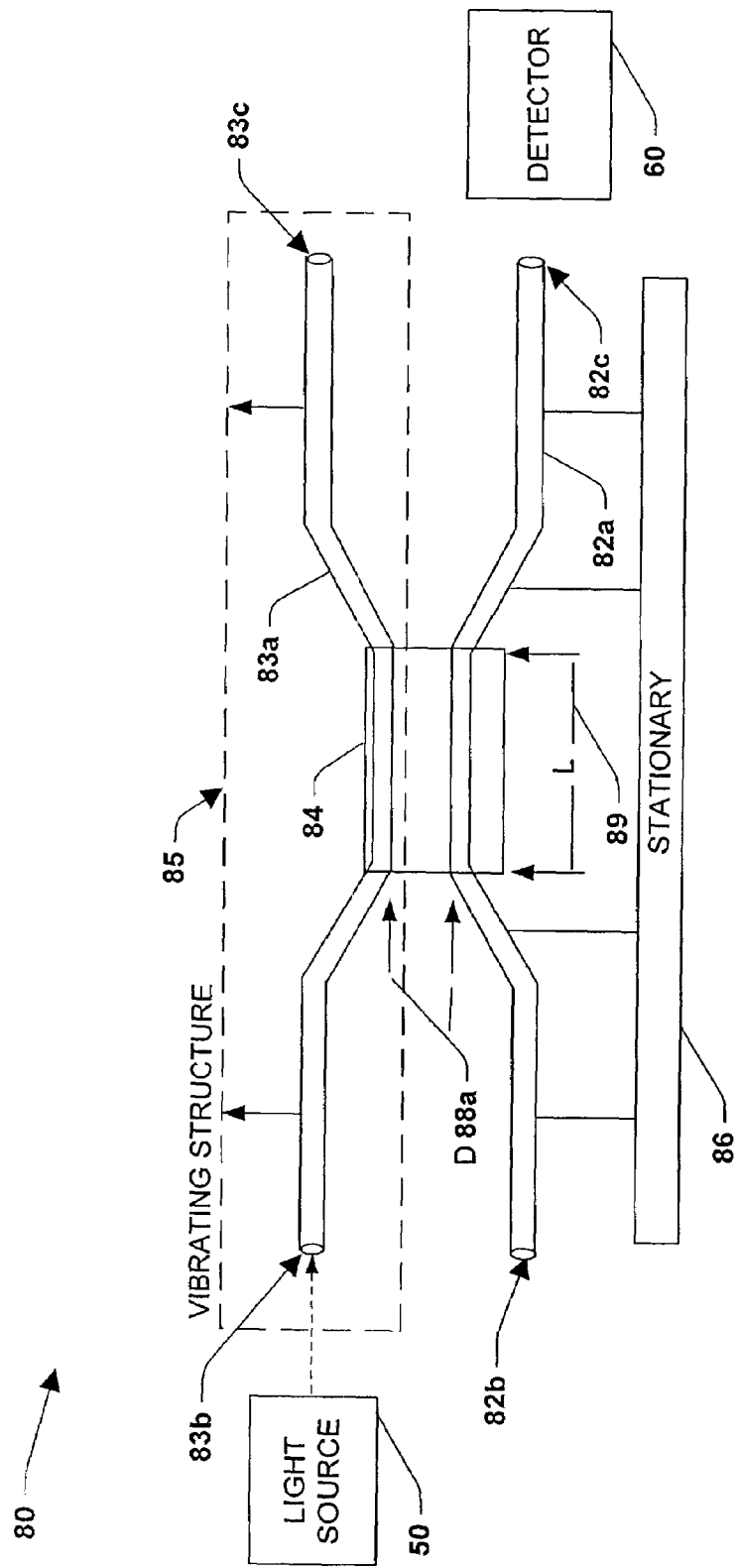
FIG. 6b is a schematic block diagram of a waveguide system illustrating minimal evanescent coupling in accordance with the present invention.

Referring to FIG. 6b, waveguides 82a and 83a are substantially separated, shown as D 88a, whereby minimal evanescent coupling occurs and detector 60 receives minimal light. Thus, by varying the separation distance, light intensity is amplitude modulated at the detector 60. The detector 60 output voltage is illustrated in FIG. 2k when minimal evanescent coupling occurs and FIG. 2l when vibration occurs. By positioning waveguide 82a in a fixed position relative to the variable position of waveguide 83a, more or less light will be coupled when vibration causes waveguide 83a to move smaller and larger distances D 88 and D 88a. It is noted that wires are not required to communicate the vibration data from waveguides 82a and 83a. Therefore, lower maintenance and installation costs may be realized since wires are not required internally or externally on the machine or structure. It is further noted, that a plurality of waveguides as shown in FIG. 6a may be positioned to sense vibration along a plurality of axis.

Figure 7A:
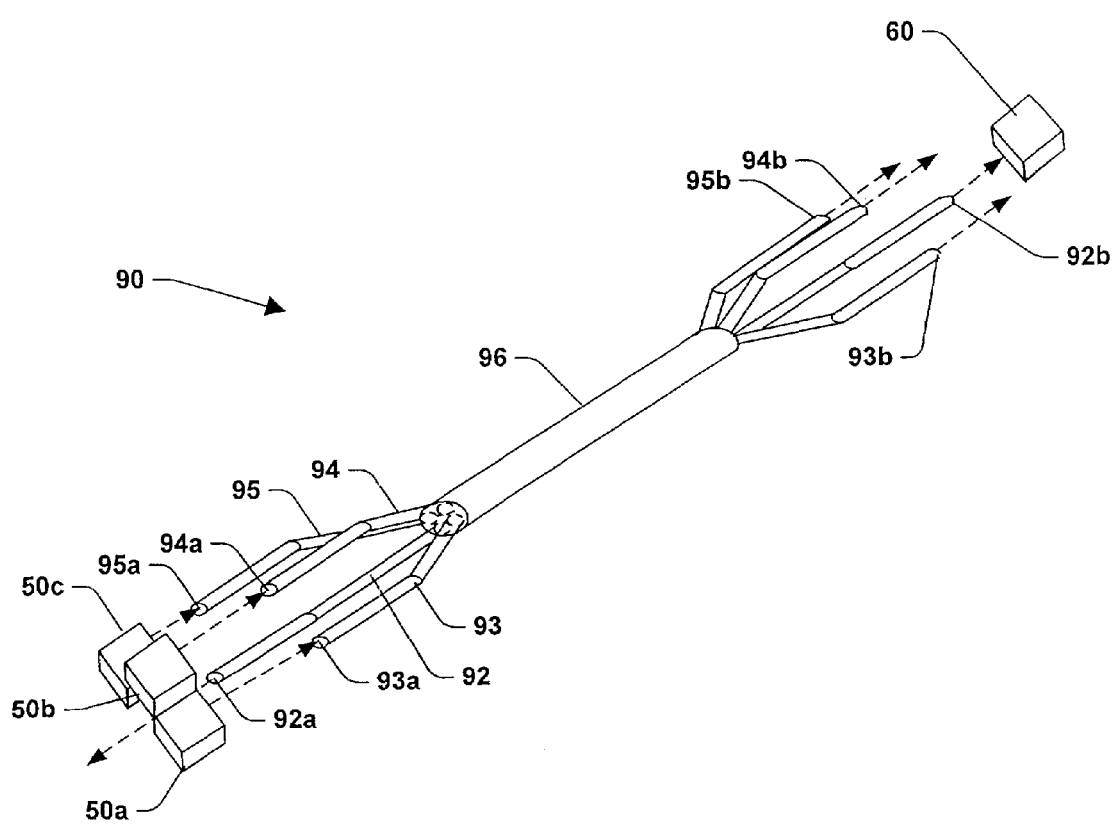
FIG. 7a is a schematic block diagram of a multi-axis waveguide system employing multiple light sources in accordance with the present invention.

Now referring to FIG. 7a, a multidimensional vibration system 90 employing a single evanescent coupling region 96 is illustrated. System 90 is advantageous because multiple axis of vibration data may be obtained from a single location thereby reducing the amount of space required to employ multiple sensing systems.

System 90, employs a waveguide 92 stationarily positioned relative to a waveguide 93, 94, and 95 which sense a plurality of vibrational directions. It is to be appreciated that more or less waveguides may be employed than the preferred embodiment shown in FIG. 7a. A detector 60 is coupled to a second end 92b of waveguide 92. Each waveguide 93, 94, and 95 will couple more or less light to waveguide 92 in evanescent region 96 based on vibration of the respective waveguides as explained above in system 80 shown if FIG. 6a.

As shown in FIG. 7a, light sources 50a, 50b, and 50c are coupled to a front end 93a, 94a, and 95a of waveguides 93, 94, and 95. It is noted that each light source 50a, 50b, 50c, uses a different wavelength of light. For example 600 nm, 580 nm, and 560 nm lasers, respectively. When coupling occurs in the evanescent region 96 with stationary waveguide 92, multiple optical frequencies are produced at detector 60 because evanescent coupling occurs from waveguides 93, 94, and 95. Thus, the detector 60 will receive a composite amplitude modulated signal composed of various optical frequencies. Therefore, filter techniques well known in the art are applied at the detector 60 output in order to distinguish which axis frequency is received. For example, wavelength division multiplexing (WDM) networks may be readily employed in system 90.

Figure 7B:
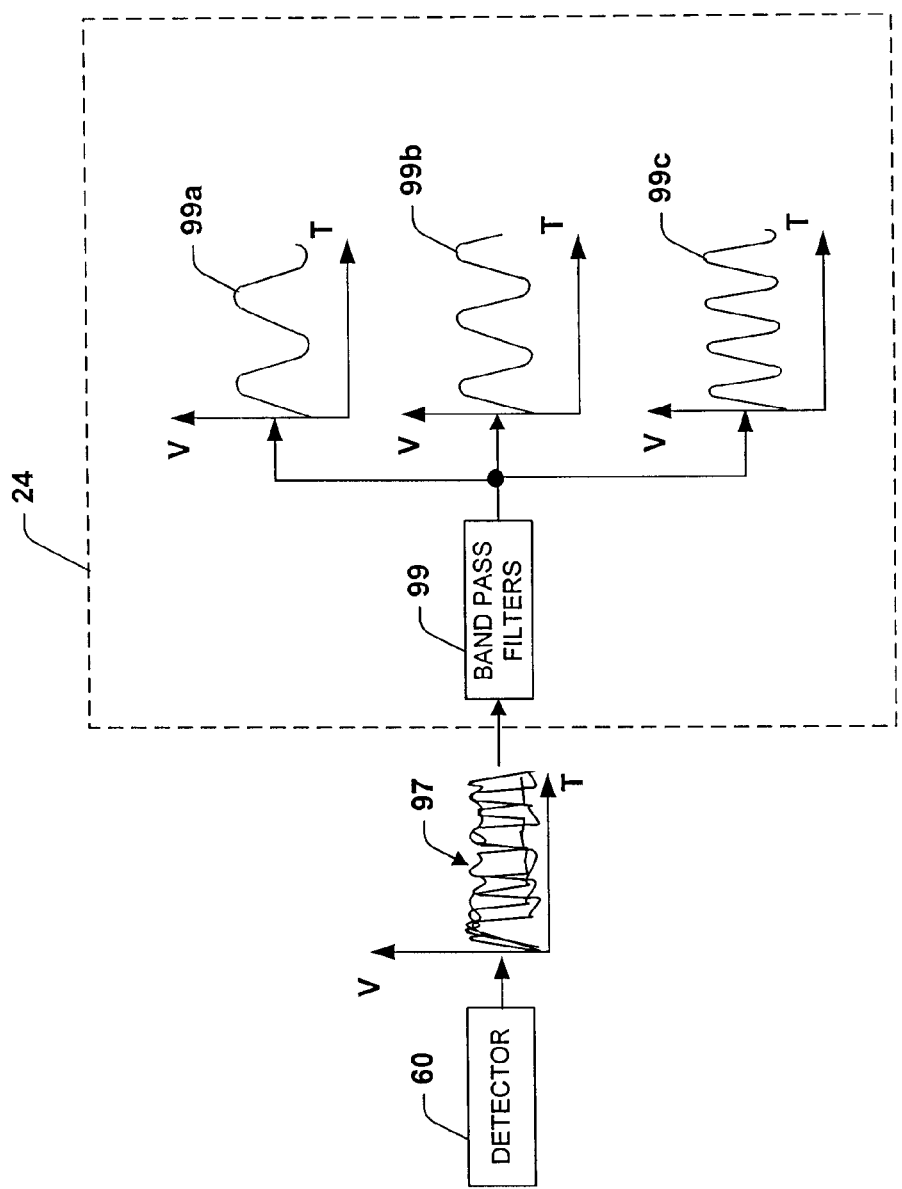
FIG. 7b is a schematic block diagram of a band pass filter and system in accordance with the present invention.

As illustrated in FIG. 7b, a composite waveform 97 is received by the signal processing system 24 and applied to a band pass filter 99. It is to be appreciated, that hardware bandpass filtering techniques may be employed to extract the 600 nm, 580 nm, and 560 nm light frequencies 99a, 99b, and 99c, for example. However, the preferred embodiment employs well known digital filtering techniques. The band pass filtering 99 is implemented by the signal processing system 24 shown in FIG. 5. After the axis frequencies 99a, 99b, and 99c are extracted, low pass filtering as described above is employed to extract vibration frequencies from the axis frequencies.

Alternatively, optical wavelength filtering (not shown) may be employed in the detector 60. For example, electro-optic material such as Lithium Niobate ($LiNbO_3$) may be employed which changes the index of refraction as a function of applied voltage. As the applied voltage is changed to the detector 60 by the signal processing system 24, the particular optical frequency of interest would be included in the detector 60 output whereas other optical frequencies would be excluded.

Figure 7C:
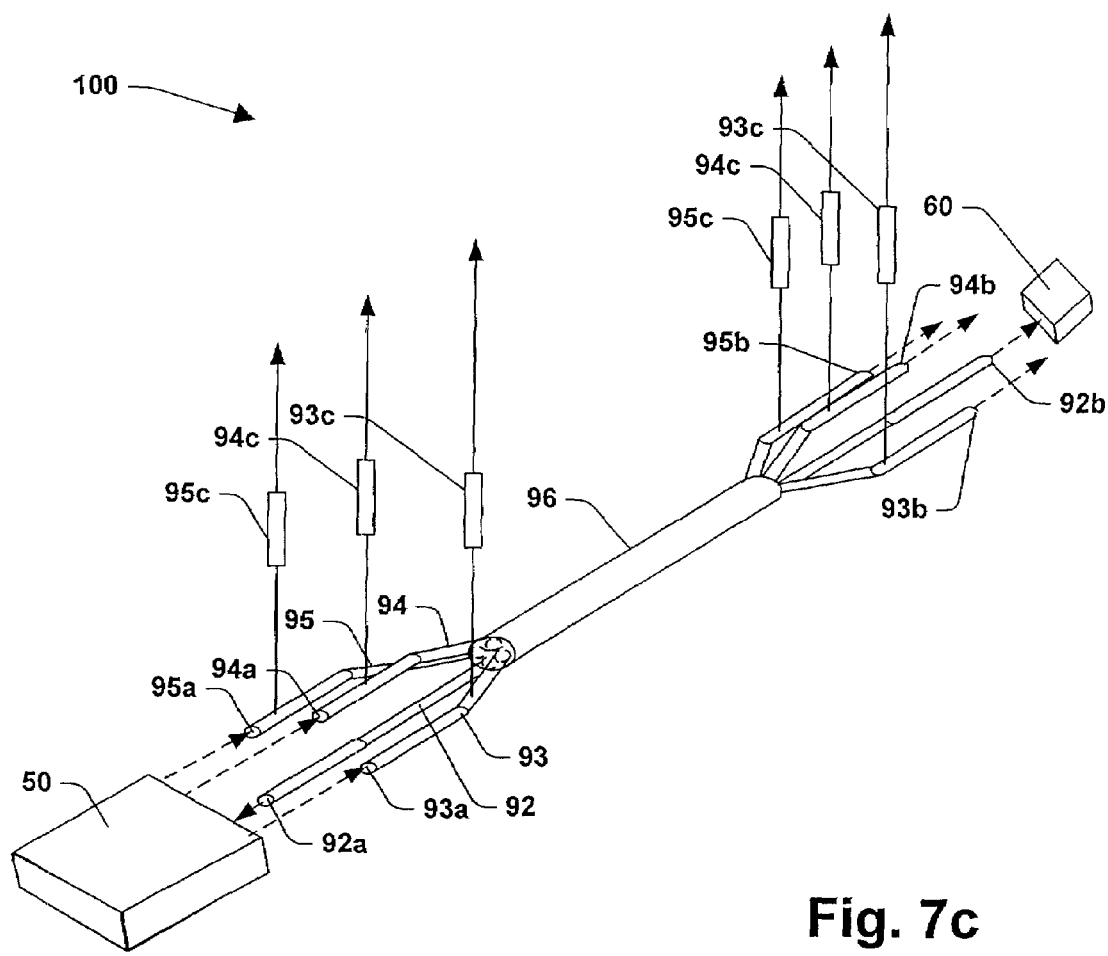
FIG. 7c is a schematic block diagram of a multi-axis waveguide system employing a single light source in accordance with the present invention.

As shown in FIG. 7c, a system 100 is illustrated which employs a single light source 50. System 100 provides a technique to reduce the number of light sources 50 illustrated in FIG. 7a. System 100 produces multiple optical frequencies in waveguide 92 by employing resonant mechanical couplings 93c, 94c, and 95c, to couple waveguides 93, 94, and 95 to a vibrating structure (not shown).

The resonant mechanical couplings 93c, 94c, and 95c have different mechanical resonant frequencies of vibration. Therefore, when waveguide 93 for example, is coupled via resonant mechanical coupling 93c, the frequency of vibration of waveguide 93, is combined with the frequency of the resonant mechanical coupling 93c. Since each resonant mechanical coupling 93c, 94c, and 95c, employs a different resonant frequency, a composite frequency 97 as shown in FIG. 7b is produced by the detector 60. The preferred embodiment employs electronically activated resonating structures for couplings 93c, 94c, and 95c, with dissimilar frequency constants. Alternatively, mechanical springs may be employed with each 93c, 94c, and 95c having different spring constants. It is to be appreciated that other resonant mechanical couplings may be employed. As discussed previously, digital bandpass filtering techniques may be applied to extract the desired axis frequencies by band pass filtering at the resonant mechanical frequencies. As discussed previously, well known low pass filtering techniques may be applied to extract axis vibration frequencies from the resonant mechanical frequencies.

Figure 8:
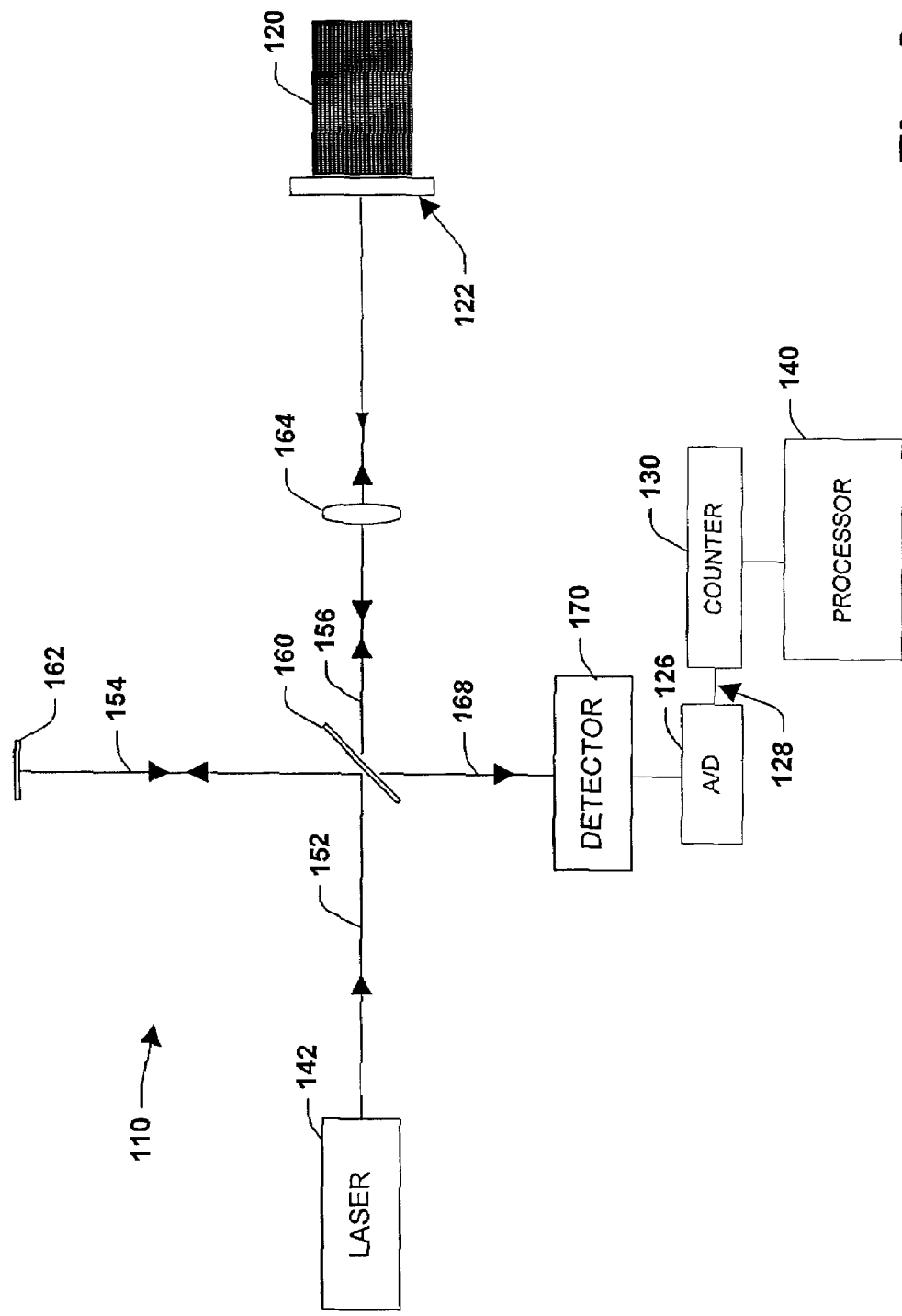
FIG. 8 is a schematic block diagram of an optical sensing system employing an optical lateral resonator in accordance with the present invention.

Another embodiment for an optical sensing system is illustrated in FIG. 8. An optical lateral resonator 120 optically coupled to an interferometer system 110 is employed to detect precise vibrations. Interferometric techniques are employed to detect precise distances on the order of the wavelength of light or smaller. For example, if an 800 nm laser were used, distance movements on the order of 80 nm may be detected. By combining the interferometer system 110 with an optical lateral resonator 120, precise vibrations of a machine or structure may be detected to aid in diagnosis and analysis of mechanical failures.

Turning now to FIG. 8, a schematic diagram of an interferometric system 110 is shown coupled to an optical lateral resonator 120. The interferometric system 110 is employed to determine vibrational movements on the surface of the optical lateral resonator 120. The optical lateral resonator 120 has a mirrored surface 122 for reflecting light to the interferometric system 110. The mirrored surface 122 is a flexible medium which can deflect in a plurality of directions based on vibrations of the optical lateral resonator 120. When the mirrored surface 122 deflects, the optical path in this transmission path is changed in length in accordance with the vibration or lateral displacement of the reflective structure.

One specific aspect of the present invention employs a Michelson-type interferometer 110. In this kind of interferometer, a light beam 152 from a coherent light source 142 is split into two beams, one of which can be referred to as a reference light beam 154 and the other as a measuring light beam 156. A semireflective mirror 160 is disposed in the beam path 152 at an angle of 45 degrees and is used as the beam splitter. A cube formed by cementing two prisms together may also be used as the beam splitter 160, where the cemented surface being also disposed in the beam path at a 45° angle.

When the beam 152 from the light source 142 (e.g., laser) reaches the beam splitter 160, the beam is split into the reference beam 154 and the measuring beam 156. The reference beam 154 is reflected toward mirror 162 where it is reflected back toward the detector 170 going through the beam splitter 160. The measuring beam passes through the beam splitter 160 and moves toward focus lens 164. The focus lens 164 focuses the measuring beam 156 at the mirrored surface 122 of the optical lateral resonator 120. It is to be appreciated that the lens 164 will not usually be needed. The measuring beam 156 is reflected off the mirrored surface 122 and travels back toward the beam splitter 160. The reflected reference beam 154 and reflected measuring beam 156 are combined by the beam splitter 160 to form an interference beam 168 which is directed toward optical detector 170.

Depending on the phasing of the two beams 154, 156 with respect to one another, the interference beam 168 can assume an amplitude between the sum of the individual amplitudes of the two beams 154, 156 (constructive interference) and zero (destructive interference). When the two beams 154, 156 are 180° out of phase (i.e., zero—destructive 20 interference), a completely dark fringe results. When the two beams 154, 156 are in phase, a bright fringe results. The light being preferably of laser form is a standing wave pattern. Accordingly, each dark fringe that results as the interference beam 168 is cycled through detector 170 corresponds to a change in the length of the optical distance to the mirrored surface 122 of $½λ$ (i.e., ½ the wavelength of the light source 142). As the mirrored surface 122 deflects because of vibration, the optical distance to the mirrored surface 122 increases or decreases causing changes in the fringe intensity. Thus, by monitoring periodic changes in the fringe, vibration data may be extracted.

By counting changes in the number of dark fringes over time, the increase and reduction in the length of the optical distance to the mirrored surface 122 over time (i.e., vibration) can be determined with great precision since the reference beam 154 is typically of high frequency. For instance, if the reference beam is from a laser diode having an emission wavelength of 800 nm, one dark fringe represents a reduction in length to the mirrored surface 122 of 400 nm. It is also possible to more precisely determine the change in reference beam length by interpreting intensity values between dark fringes and maximally bright fringes. Therefore, minute and precise vibrational movements may be detected.

The electric signal output by the detector 170 is an analog signal which is input to an analog-to-digital (A/D) converter 126 which digitizes the analog signal for ease of processing. The digital signal output by the A/D converter 126 is input via line 128 to a pulse counter 130. Each dark fringe appears as a zero ("0") or low signal in digital form. Each dark fringe that results as the interference beam 168 is cycled through the detector 170 corresponds to a reduction in the length of the mirrored surface 122 of ½λ (i.e., ½ the wavelength of the reference beam 154). The pulse counter 130 monitors for fringes and counts each fringe that cycles therethrough. The controller then determines the change in the number of counts over time to determine the vibration data. It will be appreciated that any suitable method for determining the number of fringes may be employed to carry out the present invention and falls within the scope of the claims. It is further to be appreciated that other interferometric techniques such as Mach-Zehnder may be employed to carry out the present invention.

It is important to note that all the above mentioned embodiments shown in FIGS. 3a, 4a, 6a, 7a, and 8 may be implemented with micro-electro-mechanical-systems (MEMS), or micro-opto-electro-mechanical systems (MOEMS). Waveguides, for example, may be fabricated directly in silicon by employing a small amount of doping to change the index of refraction of adjacent material respective to the waveguide material.

Figure 9:
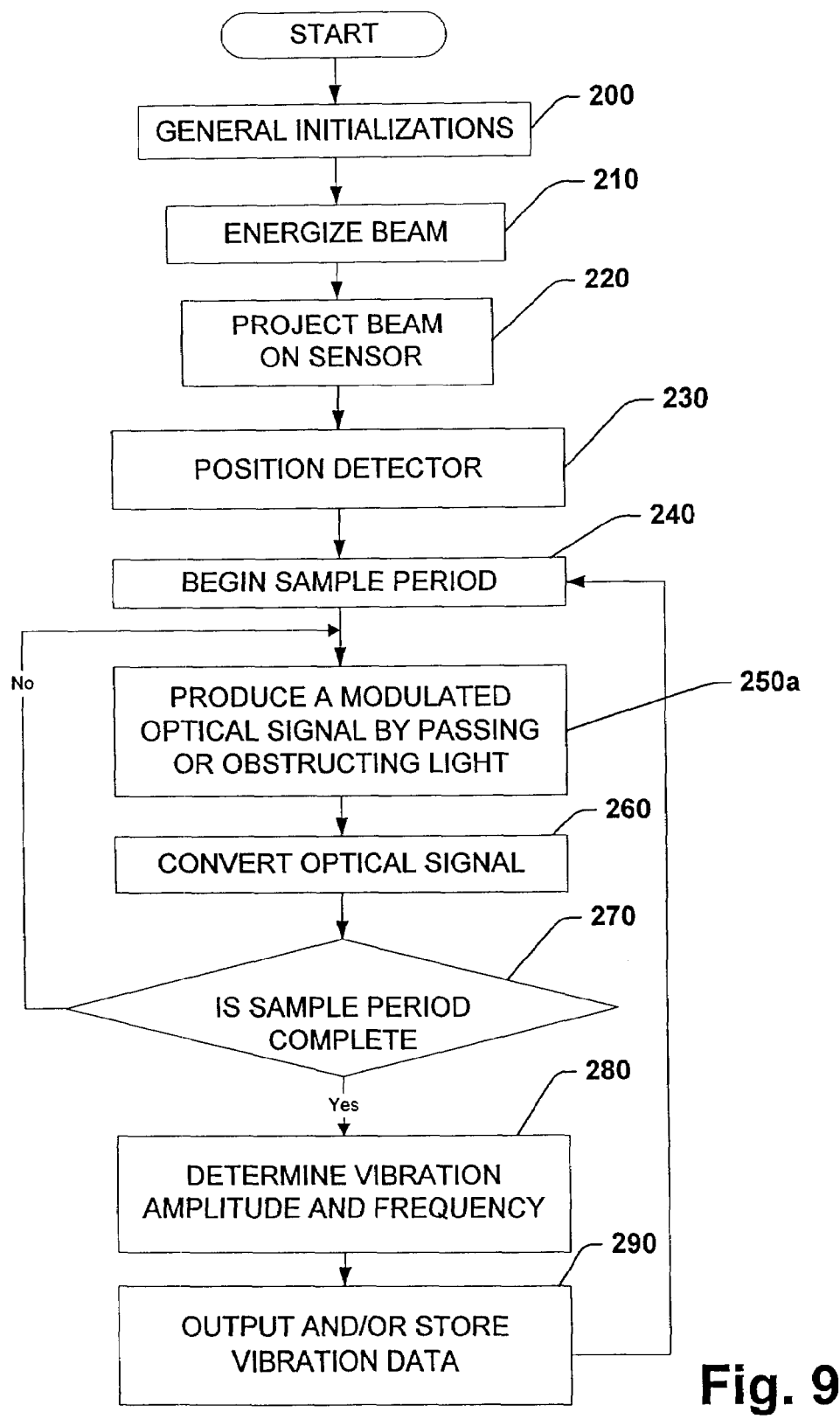
FIG. 9 is a flow diagram method for a light modulating system in accordance with the present invention.

Now referring to FIG. 9, a method for determining vibration employing the obstruction modulator depicted in FIG. 3 is illustrated in a flow diagram. In step 200, general initializations are performed such as resetting variables, pointers, and registers. The variables include vibration data determined at previous points in time. Proceeding to step 210, the method energizes light source 50 and proceeds to step 220. At step 220, the method projects light on to the obstruction modulator 53d and proceeds to step 230 whereby the detector 60 is positioned such that minimal signal output is detected when minimal vibration occurs. The method then proceeds to step 240.

At step 240, a vibration sample period begins. In the preferred embodiment, a sample period of about 1 ms is chosen. It is to be appreciated that many other sample periods may be chosen such as 0.1 ms, 10 ms, 50 ms, etc. The method proceeds to step 250a and a vibration sample begins whereby a modulated optical signal is produced by the obstruction modulator 53d. Proceeding to step 260, the method converts the modulated optical signal to an electrical signal employing the detector 60. Then, signal processing, as shown in FIG. 5, filters the vibration signal from the optical signal and the method proceeds to step 270. At step 270, the method determines whether the sample period has ended. If the sample period has not ended, the method proceeds back to step 250a whereby more vibration samples are acquired. If the sample period has ended, the method proceeds to step 280. At step 280, the method determines vibration magnitude by computing the largest amplitude of the vibration signal over the sample period. The frequency of vibration is determined by computing changes in amplitude over the sampled period. After determining vibration amplitude and frequency, the method proceeds to step 290 whereby the vibration data is output to the display 22 and/or stored for later analysis. After outputting the vibration data to the display 22, the method returns to step 240 whereby a new sample period begins.

Figure 10:
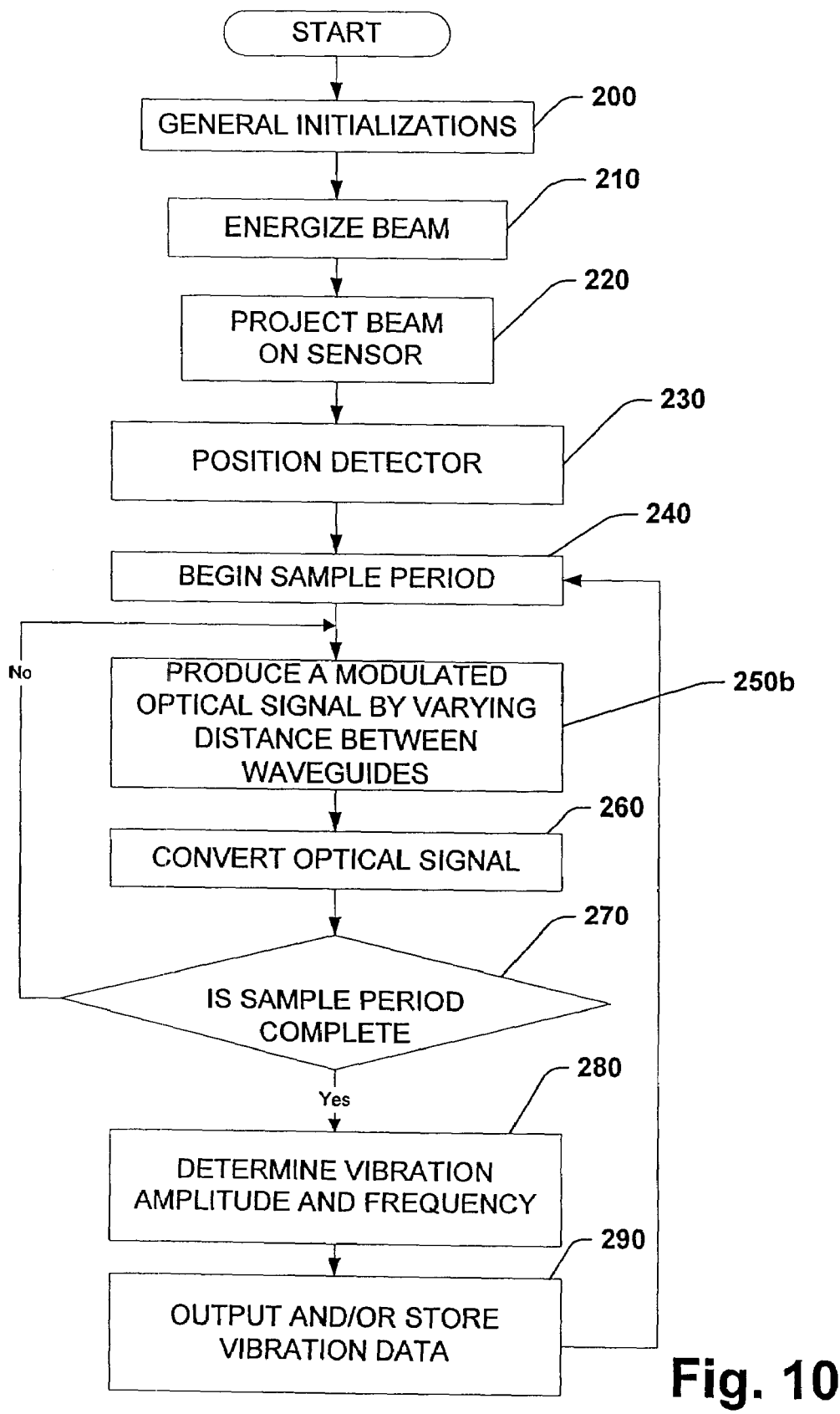
FIG. 10 is a flow diagram method for an optical waveguide system in accordance with the present invention.

Finally, referring to FIG. 10, a similar method for determining vibration employing the variable separation waveguides depicted in FIG. 7a is illustrated in a flow diagram. In step 200, general initializations are performed such as resetting variables, pointers, and registers. The variables include vibration data determined at previous points in time. Proceeding to step 210, the method energizes light source 50 and proceeds to step 220. At step 220, the method projects light on to waveguide 83a and proceeds to step 230 whereby waveguide 82a is positioned such that evanescent coupling occurs and an optical signal is received at the detector 60. The positioning of waveguide 82a should be centrally located between maximum and minimum signal at detector 60 when minimal vibration occurs. The method then proceeds to step 240.

At step 240, a vibration sample period begins. In the preferred embodiment, a sample period of about 1 ms is chosen. It is to be appreciated that many other sample periods may be chosen such as 0.1 ms, 10 ms, 50 ms, etc. The method proceeds to step 250b and a vibration sample begins whereby a modulated optical signal is produced by the waveguides 82a and 83a. Proceeding to step 260, the method converts the modulated optical signal to an electrical signal employing the detector 60. Then, signal processing, as shown in FIG. 5, filters the vibration signal from the optical signal and the method proceeds to step 270. At step 270, the method determines whether the sample period has ended. If the sample period has not ended, the method proceeds back to step 250b whereby more vibration samples are acquired. If the sample period has ended, the method proceeds to step 280. At step 280, the method determines vibration magnitude by computing the largest amplitude of the vibration signal over the sample period. The frequency of vibration is determined by computing changes in amplitude over the sampled period. After determining vibration amplitude and frequency, the method proceeds to step 290 whereby the vibration data is output to the display 22 and/or stored for later analysis. After outputting the vibration data to the display 22, the method returns to step 240 whereby a new sample period begins.

What has been described above are preferred embodiments of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system for sensing vibration of a machine, comprising:
   a light source for directing a beam of light;
   a beam splitter for splitting the beam of light into at least a first beam and a second beam;
   an optical lateral resonating system for receiving the second beam, the optical lateral resonator reflecting the second beam, the optical lateral resonating system having a flexible mirrored surface capable of deflecting in a plurality of directions in response to vibration such that a transmission path of the second beam varies in length as a function of deflection of the optical lateral resonating system;

a receiving system for receiving an interference beam, the interference beam including a combination of the first beam and reflected second beam; and a processing system for processing and analyzing the interference beam to facilitate determining vibration of the machine.

2. The system of claim 1, further comprising a mirror that reflects the first beam toward the processing system.

3. The system of claim 1, the interference beam comprises an amplitude between a sum of an amplitude of the first beam and an amplitude of the second beam.

4. The system of claim 1, a dark fringe results when the first beam and the second beam are out of phase.

5. The system of claim 1, a bright fringe results when the first beam and the second beam are in phase.

6. The system of claim 1, the beam splitter is one of a semireflective mirror and a cube comprising two prisms.

7. A system for sensing vibration of a machine, comprising:

means for directing a beam of light;

means for splitting the beam of light into at least a first beam and a second beam;

means for receiving the second beam, means for reflecting the received second beam from a flexible mirrored surface capable of deflecting in a plurality of directions, means for receiving the second beam deflecting in response to vibration such that a transmission path of the second beam varies in length as a function of deflection of the means for receiving the second beam;

means for receiving an interference beam, the interference beam including a combination of the first beam and reflected second beam; and means for processing and analyzing the interference beam to facilitate determining vibration of the machine.

* * * * *